US012800470B2

(12) United States Patent
Lee et al.

(10) Patent No.: US 12,800,470 B2
(45) Date of Patent: Nov. 17, 2026

(54) PARTICLE MEASUREMENT DEVICE

(71) Applicant: DONGWOO FINE-CHEM CO., LTD., Jeollabuk-do (KR)

(72) Inventors: Min Ju Lee, Gyeonggi-do (KR); Hee Jung Lee, Seoul (KR); Seung Pil Han, Jeollabuk-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 239 days.

(21) Appl. No.: 18/867,882

(22) PCT Filed: Mar. 21, 2023

(86) PCT No.: PCT/KR2023/003694
§ 371 (c)(1),
(2) Date: Nov. 21, 2024

(87) PCT Pub. No.: WO2024/019250
PCT Pub. Date: Jan. 25, 2024

(65) Prior Publication Data

US 2025/0321180 A1 Oct. 16, 2025

(30) Foreign Application Priority Data

Jul. 18, 2022 (KR) ........................ 10-2022-0088201

(51) Int. Cl.
*G01N 15/1434* (2024.01)
*G01N 15/00* (2024.01)
(Continued)

(52) U.S. Cl.
CPC ......... *G01N 15/1436* (2013.01); *G01N 15/02* (2013.01); *G01N 15/1404* (2013.01); *G01N 15/1425* (2013.01); *G01N 2015/0038* (2013.01)

(58) Field of Classification Search
None
See application file for complete search history.

(56) References Cited

U.S. PATENT DOCUMENTS 5,316,983 A * 5/1994 Fujimori ............ G01N 15/0205 356/336
9,772,274 B2 9/2017 Graham et al.
2025/0237595 A1* 7/2025 Kim ....................... G01N 15/02

FOREIGN PATENT DOCUMENTS

JP 2000-002648 A 1/2000
JP 2001-025465 A 1/2001
(Continued)

OTHER PUBLICATIONS

International Search Report for PCT/KR2023/003694 mailed on Jun. 26, 2023.
(Continued)

*Primary Examiner* — Peter J Macchiarolo
*Assistant Examiner* — Jermaine L Jenkins
(74) *Attorney, Agent, or Firm* — The PL Law Group, PLLC

(57) ABSTRACT

A particle measuring device includes a mount unit fixing a flow cell and a resonance unit disposed behind the mount unit. The resonance unit forms a hollow portion that is open forward and rearward. The mount unit includes a fixing module including first and second fixing modules positioned in front of the resonance unit and horizontally disposed with the flow cell interposed therebetween and a bridge module including upper and lower bridge modules respectively coupled to an upper end and a lower end of the fixing module. Each of the first and second fixing modules includes a fixing body extending in an up-down direction, a fixing body upper protrusion formed on an upper end of the fixing body and coupled to the upper bridge module, and a fixing
(Continued)

body lower protrusion formed on a lower end of the fixing body and coupled to the lower bridge module.

15 Claims, 23 Drawing Sheets

(51) Int. Cl.

| | |
|---|---|
| ***G01N 15/02*** | (2024.01) |
| ***G01N 15/14*** | (2024.01) |
| ***G01N 15/1404*** | (2024.01) |

(56) References Cited

FOREIGN PATENT DOCUMENTS

| | | | |
|---|---|---|---|
| JP | 2015-031525 | A | 2/2015 |
| KR | 10-2010-0040457 | A | 4/2010 |
| KR | 10-2324097 | B1 | 11/2021 |
| KR | 10-2482972 | B1 | 12/2022 |

OTHER PUBLICATIONS

Notice of Allowance issued on Sep. 23, 2022 from Korean Patent Office in a counterpart Korean Patent Application No. 10-2022-0088201 (all the cited references are listed in this IDS.) (English translation is also submitted herewith.).

* cited by examiner

PARTICLE MEASUREMENT DEVICE

BACKGROUND

1. Technical Field

The present disclosure relates to a particle measuring device. More particularly, the present disclosure relates to a particle measuring device efficiently measuring a liquid sample containing nanoparticles.

2. Background Art

Various organic and inorganic chemicals used in the manufacturing process of products requiring high precision, such as displays and semiconductors, require higher purity chemicals than the present to avoid a reduction in manufacturing yield, and high-level analytical techniques are being developed and newly applied to confirm the quality of high-purity chemicals. Among them, the importance of particle analysis is increasing, and even particles as small as 10 nm may affect the yield reduction and high integration of the semiconductor manufacturing process. Therefore, in addition to the need to develop a stable analytical method for quality control, the scalability of the technology must be ensured so that it is possible to analyze even the causes of defects that may occur in the manufacturing process.

A substance that is uniformly dispersed in a liquid in a molecular or ionic state is generally referred to as a solution. A state in which particles larger than normal molecules or ions and having a diameter of about 1 nm to 1,000 nm are dispersed in the solution without being aggregated or precipitated is referred to as a colloidal state, and particles in the colloidal state are called a colloid.

Research on microcolloids existing in the solution is focused on obtaining information on the physicochemical properties of a substance to be analyzed or improving the detection power of a separation analyzer. The analysis of colloidal particles until recently has a limit of 100 nm in size, and development of technology is required in that a high concentration sample is required for accurate analysis of colloidal particles of 100 nm or less.

As a method of measuring colloidal nanoparticles, a light scattering analysis method for checking a size of particles using a light scattering intensity is generally used. However, when measuring fine nanoparticles with a size smaller than 100 nm, even if scattered light is generated, the probability of detecting fine nanoparticles at a low concentration is rapidly reduced, thereby making it difficult to obtain reliable results. Further, there is a limit that a concentration of particles must be several ppm (parts per million) or more. As the size of particles increases, the scattering light intensity increases. On the other hand, because the area capable of scattering light is reduced as the size of particles decreases, an intensity of scattered light is weak, thereby making it difficult to measure. Therefore, since a relatively large number of particles must be able to contribute to the scattering, sensitivity is greatly reduced at a concentration below ppm.

When laser induced breakdown is generated by irradiating a laser beam to the nanoparticles, it may lead to a shock wave. When nanoparticles are measured by measuring an acoustic signal of the shock wave, noise in addition to the acoustic signal are easily measured at the same time, and thus there is a need to amplify the acoustic signal.

SUMMARY

An object of the present disclosure is to address the above-described and other problems.

Another object of the present disclosure is to provide a particle measuring device that efficiently measures nanoparticles.

Another object of the present disclosure is to provide a particle measuring device that effectively fixes a flow cell in which a liquid sample containing nanoparticles flows.

Another object of the present disclosure is to provide a particle measuring device that effectively suppresses a twisting force.

Another object of the present disclosure is to provide a particle measuring device that effectively measures acoustic waves generated from nanoparticles.

Another object of the present disclosure is to provide a particle measuring device that amplifies a specific frequency band among generated acoustic waves.

Another object of the present disclosure is to provide a particle measuring device including a resonance plate resonating at a specific frequency band.

Another object of the present disclosure is to provide a particle measuring device that forms a resonance space in which acoustic waves resonate.

Another object of the present disclosure is to provide a particle measuring device that adjusts at least one of a shape and a size of a resonance space.

In order to achieve the above-described and other objects and needs, in one aspect of the present disclosure, there is provided a particle measuring device including a mount unit fixing a flow cell; and a resonance unit disposed behind the mount unit, the resonance unit forming a hollow portion that is open forward and rearward, wherein the mount unit includes a fixing module including a first fixing module and a second fixing module that are positioned in front of the resonance unit and are horizontally disposed with the flow cell interposed therebetween; and a bridge module including an upper bridge module and a lower bridge module that are respectively coupled to an upper end and a lower end of the fixing module, wherein each of the first fixing module and the second fixing module includes a fixing body extending in an up-down direction: a fixing body upper protrusion formed on an upper end of the fixing body and coupled to the upper bridge module; and a fixing body lower protrusion formed on a lower end of the fixing body and coupled to the lower bridge module.

Effects of a particle measuring device according to the present disclosure are described as follows.

According to at least one aspect of the present disclosure, the present disclosure can provide a particle measuring device that efficiently measures nanoparticles.

According to at least one aspect of the present disclosure, the present disclosure can provide a particle measuring device effectively fixing a flow cell in which a liquid sample containing nanoparticles flows.

According to at least one aspect of the present disclosure, the present disclosure can provide a particle measuring device that effectively suppresses a twisting force.

According to at least one aspect of the present disclosure, the present disclosure can provide a particle measuring device that effectively measures acoustic waves generated from nanoparticles.

According to at least one aspect of the present disclosure, the present disclosure can provide a particle measuring device that amplifies a specific frequency band among generated acoustic waves.

According to at least one aspect of the present disclosure, the present disclosure can provide a particle measuring device including a resonance plate resonating at a specific frequency band.

According to at least one aspect of the present disclosure, the present disclosure can provide a particle measuring device that forms a resonance space in which acoustic waves resonate.

According to at least one aspect of the present disclosure, the present disclosure can provide a particle measuring device that adjusts at least one of a shape and a size of a resonance space.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

DETAILED DESCRIPTION

Figure 1:
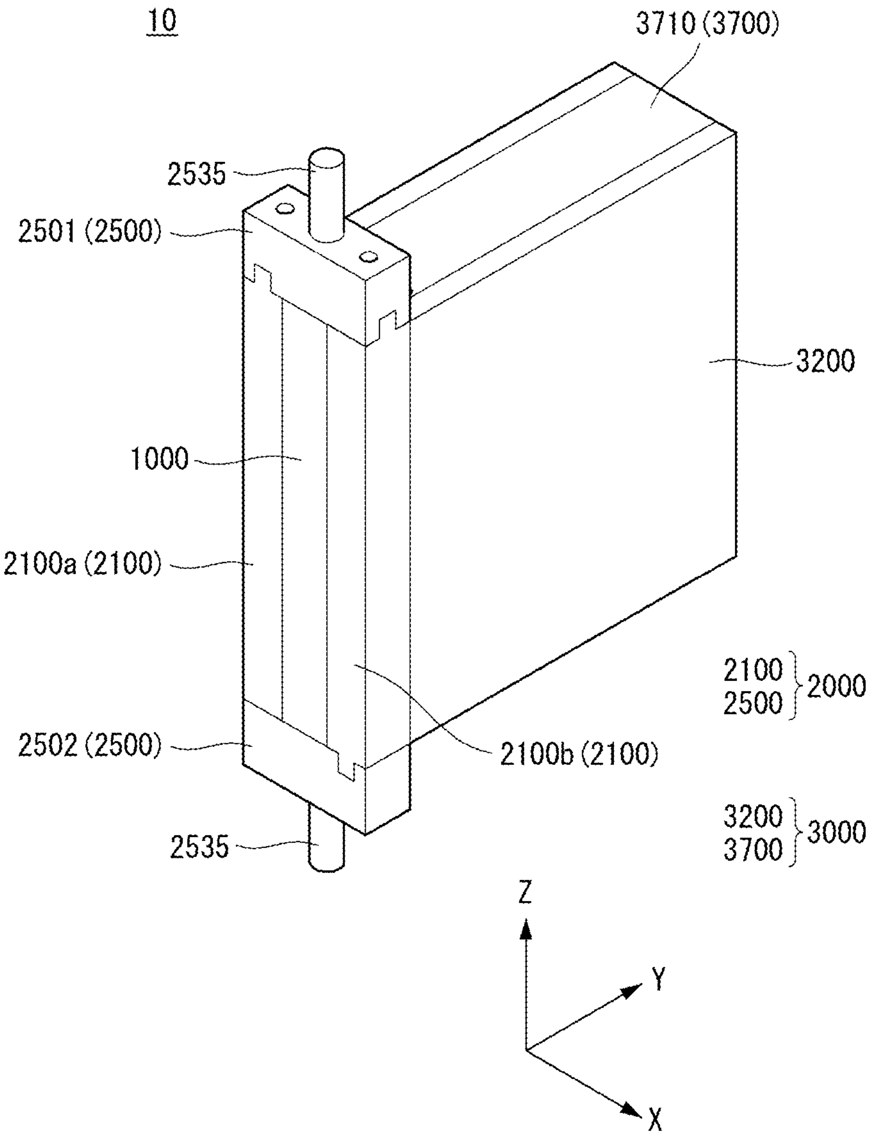
FIGS. 1 to 3 illustrate a particle measuring device according to an embodiment of the present disclosure when viewed from multiple directions.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

Figure 2:
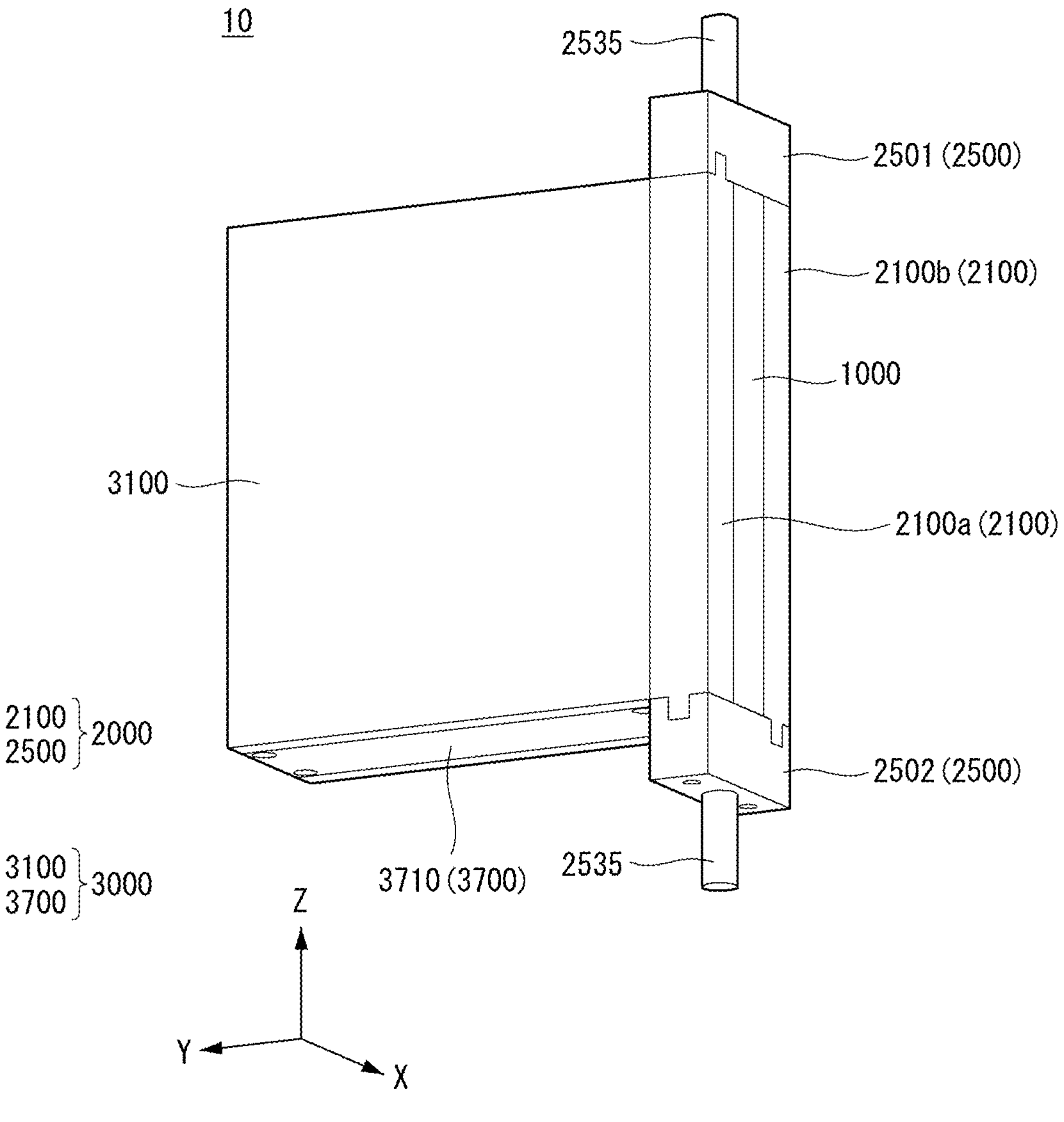
Figure 3:
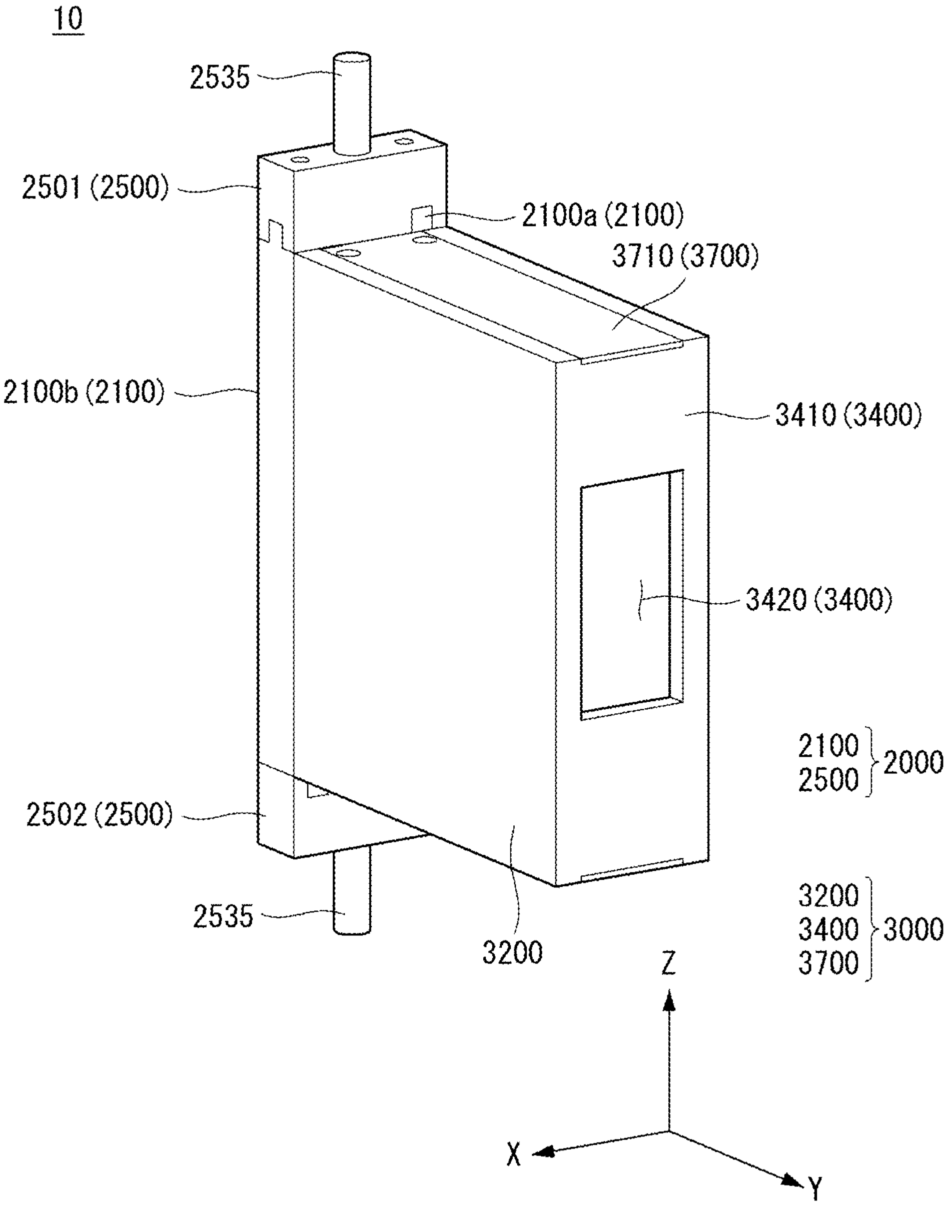
Figure 4:
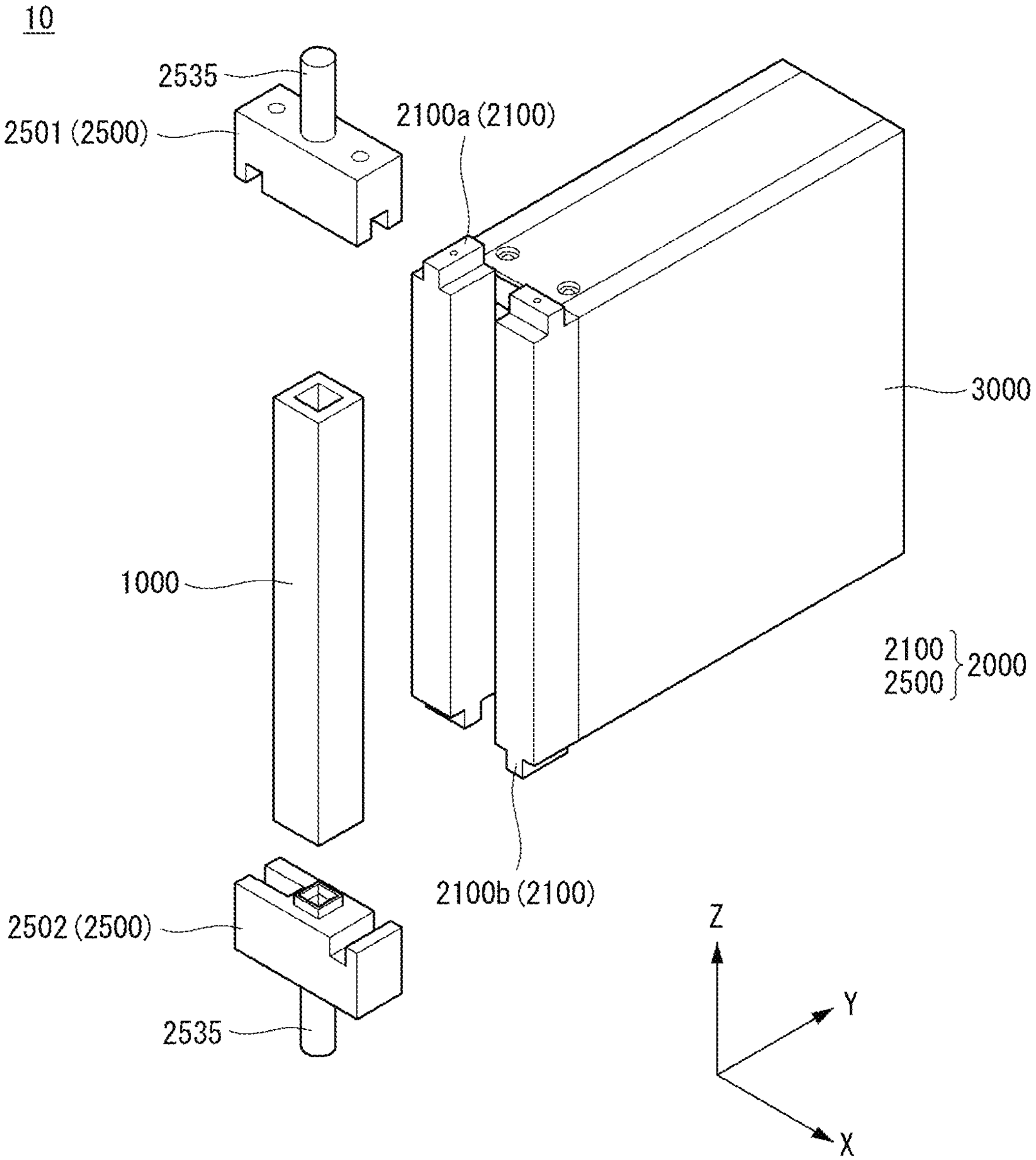
FIG. 4 is an exploded perspective view of a particle measuring device according to an embodiment of the present disclosure.

FIGS. 1 to 3 illustrate a particle measuring device 10 according to an embodiment of the present disclosure when viewed from multiple directions. For example, a front face, a right face, and an upper face of the particle measuring device 10 may be observed in FIG. 1. For example, the front face, a left face, and a lower face of the particle measuring device 10 may be observed in FIG. 2. For example, the right face, the upper face, and a rear face of the particle measuring device 10 may be observed in FIG. 3. FIG. 4 is an exploded perspective view of the particle measuring device 10 according to an embodiment of the present disclosure.

In the present disclosure, a cartesian coordinate system can be used to indicate the direction of the particle measuring device 10.

For example, a negative Y-axis direction may indicate a forward direction of the particle measuring device 10. For example, a positive Y-axis direction may indicate a rearward direction of the particle measuring device 10.

For example, a negative X-axis direction may indicate a left direction of the particle measuring device 10. For example, a positive X-axis direction may indicate a right direction of the particle measuring device 10.

For example, a negative Z-axis direction may indicate a downward direction of the particle measuring device 10. For example, a positive Z-axis direction may indicate an upward direction of the particle measuring device 10.

Referring to FIGS. 1 to 4, the particle measuring device 10 may include a flow cell 1000. The flow cell 1000 may form a shape extending in one direction. For example, the flow cell 1000 may form a shape extending from bottom to top.

The flow cell 1000 may be a passage through which liquid flows. For example, the liquid may flow from a lower end to an upper end of the flow cell 1000. The liquid flowing in the flow cell 1000 may include nanoparticles. The nanoparticles contained in the liquid flowing in the flow cell 1000 may be an object that the particle measuring device 10 intends to measure.

At least a portion of the flow cell 1000 may transmit light or electromagnetic waves. For example, at least a portion of light or electromagnetic waves incident on a front face of the flow cell 1000 may pass through the flow cell 1000 and travel from a rear face of the flow cell 1000 to the rear of the flow cell 1000.

The particle measuring device 10 may include a mount unit 2000. The mount unit 2000 may be coupled to the flow cell 1000. For example, the flow cell 1000 may be fixed to the mount unit 2000.

The mount unit 2000 may include a fixing module 2100. The fixing module 2100 may be coupled to the flow cell 1000 or may fix the flow cell 1000. For example, the fixing module 2100 may be positioned on left and right sides of the flow cell 1000.

A plurality of fixing modules 2100 may be provided. For example, the fixing modules 2100 may include a first fixing module 2100*a* and a second fixing module 2100*b*. For example, the fixing module 2100 may indicate at least one of the first fixing module 2100*a* and the second fixing module 2100*b*.

The first fixing module 2100*a* may face the left side of the flow cell 1000. The second fixing module 2100*b* may face the right side of the flow cell 1000. The flow cell 1000 may be disposed between the first fixing module 2100*a* and the second fixing module 2100*b*.

The mount unit 2000 may include a bridge module 2500. The bridge module 2500 may be coupled to the first fixing module 2100*a* and the second fixing module 2100*b*. The bridge module 2500 may connect the first fixing module 2100*a* to the second fixing module 2100*b*.

A plurality of bridge modules 2500 may be provided. For example, the bridge module 2500 may include an upper bridge module 2501 and a lower bridge module 2502. For example, the bridge module 2500 may indicate at least one of the upper bridge module 2501 and the lower bridge module 2502.

The upper bridge module 2501 may be coupled to an upper end of the fixing module 2100. For example, the upper bridge module 2501 may be coupled to an upper end of the first fixing module 2100*a* and an upper end of the second fixing module 2100*b*.

The lower bridge module 2502 may be coupled to a lower end of the fixing module 2100. For example, the lower bridge module 2502 may be coupled to a lower end of the first fixing module 2100*a* and a lower end of the second fixing module 2100*b*.

The bridge module 2500 can suppress twisting of the fixing module 2100. The bridge module 2500 can prevent a gap between the first fixing module 2100*a* and the second fixing module 2100*b* from being generated. The bridge module 2500 can provide a coupling force between the fixing module 2100 and the flow cell 1000.

The bridge module 2500 may be connected to the flow cell 1000. For example, the bridge module 2500 may communicate with the flow cell 1000. The bridge module 2500 may include a flow cell extension pipe 2535. The flow cell extension pipe 2535 may be a passage through which the liquid flowing in the flow cell 1000 flows. In FIGS. 1 to 3, only a portion of the flow cell extension pipe 2535 may be illustrated.

The particle measuring device 10 may include a resonance unit 3000. The resonance unit 3000 may form a space inside. An internal space of the resonance unit 3000 may be referred to as a "resonance space."

The resonance unit 3000 may include a first side case 3100. The first side case 3100 may be disposed behind the first fixing module 2100*a*. The first side case 3100 may be connected or coupled to the first fixing module 2100*a*. For example, the first side case 3100 may form a shape extending rearward from the first fixing module 2100*a*.

The resonance unit 3000 may include a second side case 3200. The second side case 3200 may be disposed behind the second fixing module 2100*b*. The second side case 3200 may be connected or coupled to the second fixing module 2100*b*. For example, the second side case 3200 may form a shape extending rearward from the second fixing module 2100*b*.

The first side case 3100 and the second side case 3200 may face each other. The first side case 3100 and the second side case 3200 may be spaced apart from each other. For example, the first side case 3100 and the second side case 3200 may be horizontally spaced apart from each other.

The first side case 3100 and the second side case 3200 may face the resonance space. The side cases 3100 and 3200 may indicate at least one of the first side case 3100 and the second side case 3200.

The resonance unit 3000 may include a rear case 3400. The rear case 3400 may include a rear case plate 3410. The rear case plate 3410 may form a rear face of the resonance unit 3000. The rear case plate 3410 may form the shape of a plate. The rear case plate 3410 may face the resonance space.

The rear case 3400 may include a rear case opening 3420. The rear case opening 3420 may be formed in the rear case plate 3410. The rear case opening 3420 may be formed to penetrate the rear case plate 3410 in a front-rear direction. The rear case opening 3420 may communicate with the resonance space.

The resonance unit 3000 may include a resonance module 3700. The resonance module 3700 may include a resonance plate 3710. The resonance plate 3710 may be in contact with the side cases 3100 and 3200. The resonance plate 3710 may form an outer face of the resonance unit 3000. For example, the resonance plate 3710 may form at least a portion of an upper face of the resonance unit 3000. For example, the resonance plate 3710 may form at least a portion of a lower face of the resonance unit 3000.

For another example, the resonance module 3700 may be formed on the side cases 3100 and 3200. For another example, the resonance module 3700 may be formed on the rear case 3400.

For another example, the resonance module 3700 may be positioned in the resonance space. For example, the resonance module 3700 may be disposed between the first side case 3100 and the second side case 3200. For example, the resonance module 3700 may be disposed in front of the rear case plate 3410.

An operating principle of the particle measuring device 10 can be described. A laser beam may be incident on the front face of the flow cell 1000. The laser beam may be incident on the flow cell 1000 in a pulse method. At least a portion of the laser beam incident on the front face of the flow cell 1000 may reach the inside of the flow cell 1000. At least a portion of the laser beam reaching the inside of the flow cell 1000 may pass through the rear case opening 3420 and travel to the rear of the resonance unit 3000.

The laser beam reaching the inside of the flow cell 1000 may apply energy to the liquid (or liquid sample) flowing in the flow cell 1000. For example, particles contained in the liquid sample may receive the energy from the laser beam. The size of the particles contained in the liquid sample may be at a nanometer level. In this context, the particles contained in the liquid sample may be referred to as "nanoparticles."

When the nanoparticles contained in the liquid sample receive the energy from the laser beam, a shock wave may be generated. For example, when the liquid sample receives the energy from the laser beam, plasma may be generated in a space where the liquid sample reacts to the laser beam.

For example, when the plasma or the shock wave is generated inside the flow cell 1000, acoustic waves may be generated and travel to the rear of the flow cell 1000.

The properties of the acoustic waves may depend on a state of the nanoparticles. The state of the nanoparticles may be a state related to at least one of a number density of the nanoparticles, a size distribution of the nanoparticles, or a shape of the nanoparticles. Therefore, information on the nanoparticles can be obtained by measuring and analyzing the acoustic waves.

In order to effectively measure the acoustic waves, it may be necessary to increase an amplitude of the acoustic wave. The resonance unit 3000 may resonate the acoustic waves.

For example, the resonance plate 3710 of the resonance unit 3000 may resonate the acoustic waves. For example, the resonance plate 3710 may resonate a portion of the acoustic wave corresponding to a natural frequency of the resonance plate 3710. Therefore, the acoustic wave can be effectively measured by matching the natural frequency of the resonance plate 3710 to a frequency band of the acoustic wave to be measured.

The natural frequency of the resonance plate 3710 may be determined based on at least one of a material, elasticity, a length, a thickness, or a width of the resonance plate 3710. For example, the natural frequency of the resonance plate 3710 may be adjusted by adjusting the length of the resonance plate 3710.

The length of the resonance plate 3710 may be based on the front-rear direction. For example, the length of the resonance plate 3710 may indicate a distance from a fixed end to a free end of the resonance plate 3710. In other words, the natural frequency of the resonance plate 3710 can be adjusted by adjusting the distance from the fixed end to the free end of the resonance plate 3710.

For another example, the resonance space of the resonance unit 3000 may resonate the acoustic waves. For example, a frequency of a resonating portion of the acoustic wave can be controlled by adjusting at least one of a shape and a size of the resonance space of the resonance unit 3000.

Figure 5:
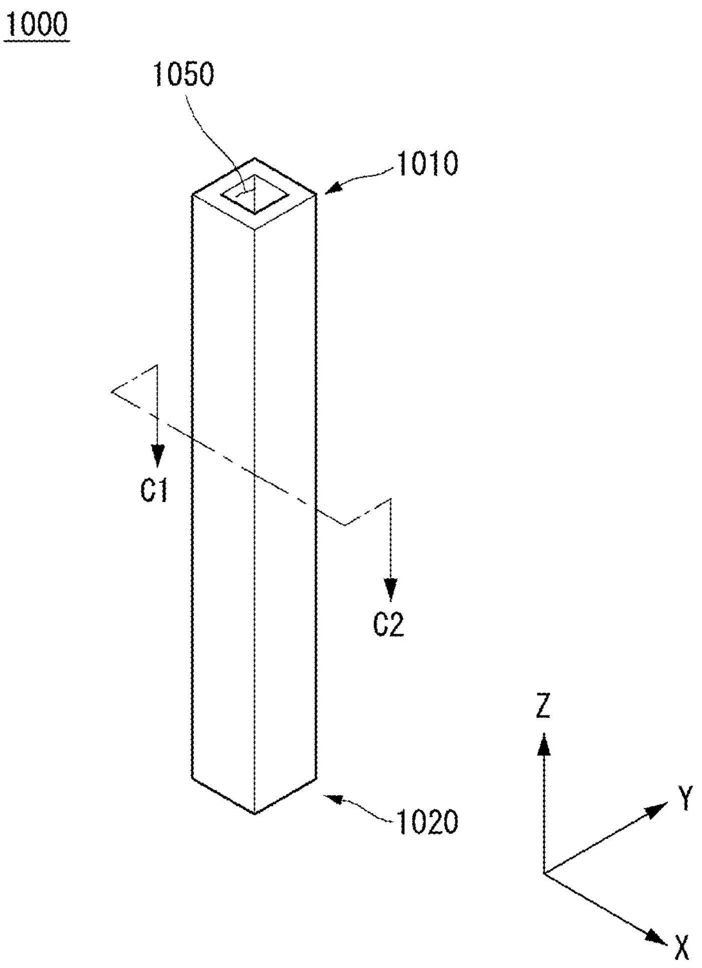
FIG. 5 illustrates a flow cell according to an embodiment of the present disclosure.
Figure 6:
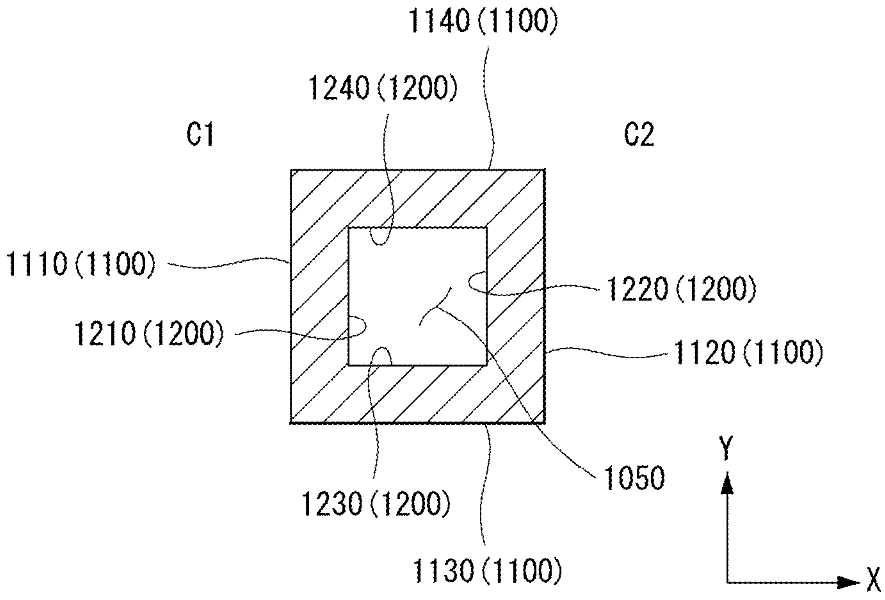
FIG. 6 illustrates a cross section of a flow cell of FIG. 5 taken along C1-C2.

FIG. 5 illustrates the flow cell 1000 according to an embodiment of the present disclosure. FIG. 6 illustrates a cross section of the flow cell of FIG. 5 taken along C1-C2.

Referring to FIGS. 5 and 6, the flow cell 1000 may form a shape extending in one direction. For example, the flow cell 1000 may extend from the upper end and lead to the lower end. For example, a flow cell upper end 1010 may form the upper end of the flow cell 1000. For example, a flow cell lower end 1020 may form the lower end of the flow cell 1000.

The flow cell 1000 may form a hollow portion inside. For example, a flow cell hollow portion 1050 may be the hollow portion formed inside the flow cell 1000. The flow cell hollow portion 1050 may be connected to the flow cell upper end 1010 and the flow cell lower end 1020. For example, the flow cell hollow portion 1050 may be open at the flow cell upper end 1010. For example, the flow cell hollow portion 1050 may be open at the flow cell lower end 1020.

The flow cell hollow portion 1050 may be a passage through which the liquid sample flows. For example, the liquid sample may be introduced into the flow cell hollow portion 1050 from the flow cell lower end 1020, flow upward, and be discharged from the flow cell upper end 1010 to the outside of the flow cell 1000.

The flow cell 1000 may form an outer face. For example, a cell outer face 1100 may indicate an outer face of the flow cell 1000. The cell outer face 1100 may include a first cell coupling face 1110. The first cell coupling face 1110 may face and be in close contact with the first fixing module 2100*a* (see FIG. 1). The cell outer face 1100 may include a second cell coupling face 1120. The second cell coupling face 1120 may face and be in close contact with the second fixing module 2100*b* (see FIG. 1). The cell coupling faces 1110 and 1120 may indicate at least one of the first cell coupling face 1110 and the second cell coupling face 1120.

The cell outer face 1100 may include a cell incident face 1130. The cell incident face 1130 may form the front face of the flow cell 1000. The cell incident face 1130 may be a face on which the laser beam is incident. The cell outer face 1100 may include a cell transmission face 1140. The cell transmission face 1140 may form the rear face of the flow cell

1000. The cell transmission face 1140 may be a face through which the laser beam passes and travels to the outside.

A cell inner face 1200 may form the flow cell hollow portion 1050. The cell inner face 1200 may include a first cell inner face 1210 and a second cell inner face 1220. The first cell inner face 1210 may correspond to the first cell coupling face 1110. The second cell inner face 1220 may correspond to the second cell coupling face 1120. The cell inner face 1200 may include a third cell inner face 1230 and a fourth cell inner face 1240. The third cell inner face 1230 may correspond to the cell incident face 1130. The fourth cell inner face 1240 may correspond to the cell transmission face 1140.

Figure 7:
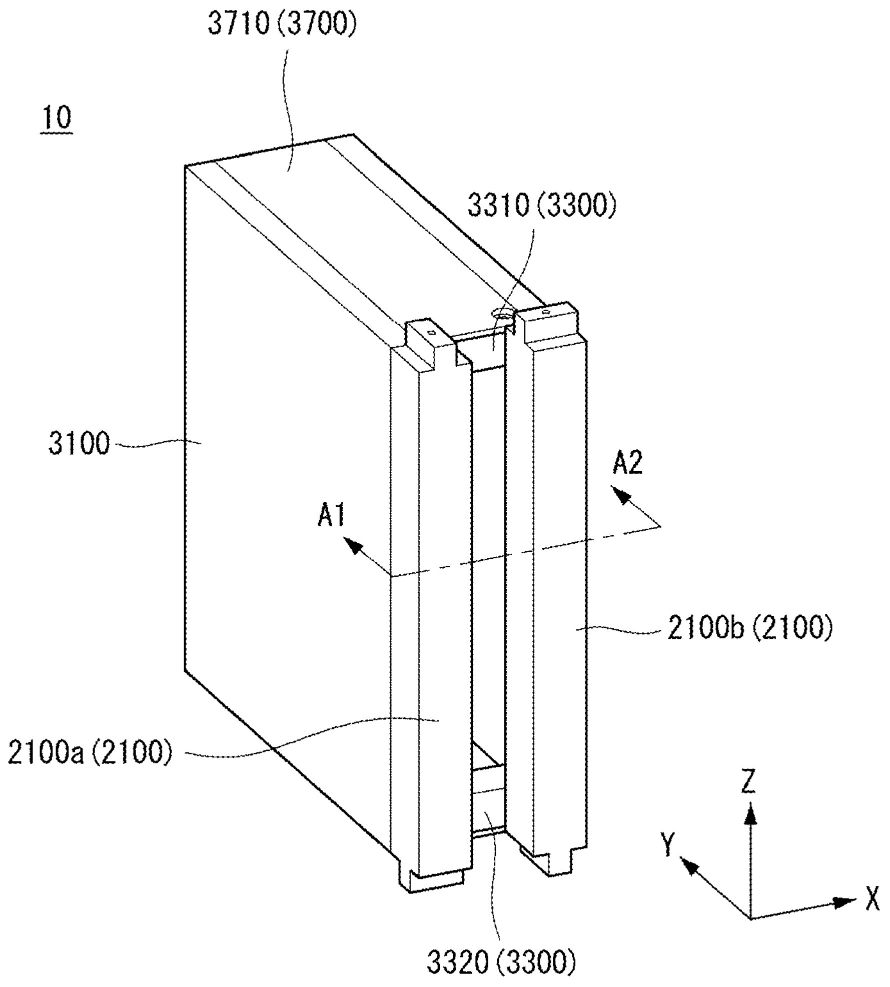
FIGS. 7 and 8 illustrate a fixing module and a resonance unit according to an embodiment of the present disclosure when viewed from different angles.
Figure 8:
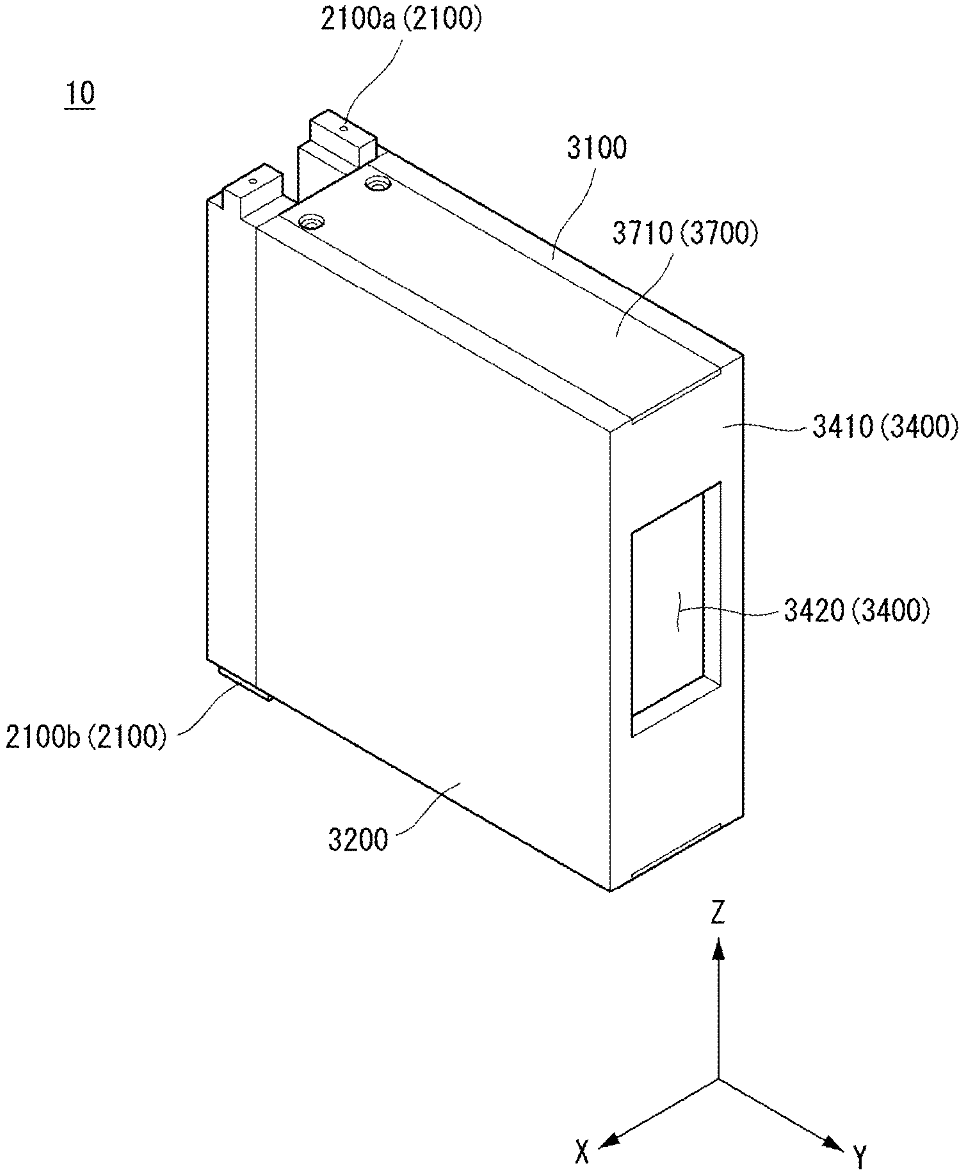

FIGS. 7 and 8 illustrate a fixing module and a resonance unit according to an embodiment of the present disclosure when viewed from different angles.

Referring to FIGS. 7 and 8, the resonance unit 3000 may include a front beam 3300. The front beam 3300 may form a front portion of the resonance unit 3000. The front beam 3300 may connect the first side case 3100 to the second side case 3200. The front beam 3300 may be coupled to each of the first side case 3100 and the second side case 3200. The front beam 3300 may be positioned behind the fixing module 2100.

A plurality of front beams 3300 may be provided. For example, the front beam 3300 may include an upper front beam 3310. The upper front beam 3310 may be coupled or connected to upper ends of the side cases 3100 and 3200. For example, a lower front beam 3320 may be coupled or connected to lower ends of the side cases 3100 and 3200.

The upper front beam 3310, the lower front beam 3320, the first fixing module 2100*a*, and the second fixing module 2100*b* may form an opening. The opening formed by the upper front beam 3310, the lower front beam 3320, the first fixing module 2100*a*, and the second fixing module 2100*b* may be closed by the flow cell 1000 (see FIG. 1).

The first side case 3100 may form a shape extending rearward from the first fixing module 2100*a*. For example, the first side case 3100 and the first fixing module 2100*a* may be formed integrally.

The second side case 3200 may form a shape extending rearward from the second fixing module 2100*b*. For example, the second side case 3200 and the second fixing module 2100*b* may be formed integrally.

An end of the resonance plate 3710 may be coupled to the front beam 3300. For example, a front end of the resonance plate 3710 may be coupled to the upper front beam 3310. For another example, the front end of the resonance plate 3710 may be coupled to the lower front beam 3320.

At least one of the front end and a rear end of the resonance plate 3710 may be coupled or fixed to the cases 3100, 3200, 3300 and 3400. The cases 3100, 3200, 3300 and 3400 may indicate at least one of the first side case 3100, the second side case 3200, the front beam 3300, or the rear case 3400.

For example, the front end of the resonance plate 3710 may be coupled and fixed to the upper front beam 3300, and the rear end of the resonance plate 3710 may be separated from the cases 3100, 3200, 3300 and 3400. In this case, the front end of the resonance plate 3710 may be a fixed end, and the rear end of the resonance plate 3710 may be a free end.

For example, the front end of the resonance plate 3710 may be coupled and fixed to the upper front beam 3300, and the rear end of the resonance plate 3710 may be coupled and fixed to an upper end of the rear case 3400. In this case, both the front end and the rear end of the resonance plate 3710 may be fixed ends.

The combination and arrangement of the fixed end and the free end of the resonance plate 3710 may affect the natural frequency of the resonance plate 3710. The combination and arrangement of the fixed end and the free end of the resonance plate 3710 can be adjusted based on the frequency band of the acoustic wave to be measured.

The cases 3100, 3200, 3300, 3400 and 3500 may include at least one of the first side case 3100, the second side case 3200, the front beam 3300, the rear case 3400, an upper case 3500 (see FIG. 15), or a lower case (not shown).

The cases 3100, 3200, 3300, 3400 and 3500 may form a resonance space. The cases 3100, 3200, 3300, 3400 and 3500 may face the resonance space. The cases 3100, 3200, 3300, 3400 and 3500 and the resonance module 3700 may form a resonance space. The resonance module 3700 may be coupled to the cases 3100, 3200, 3300, 3400 and 3500.

Figure 9:
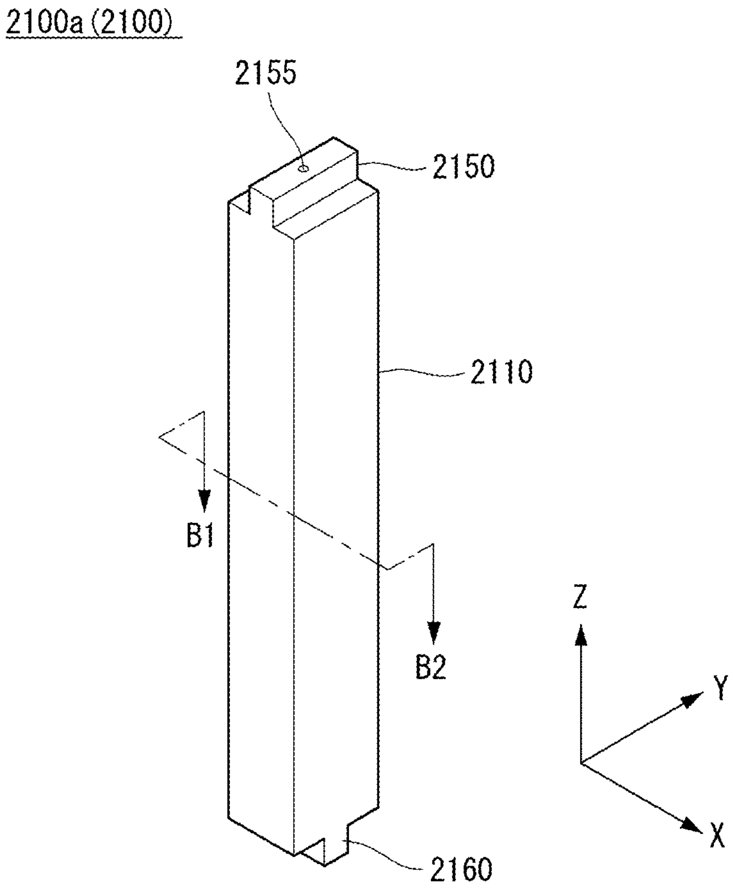
FIG. 9 is a perspective view of a first fixing module of FIG. 1.
Figure 10:
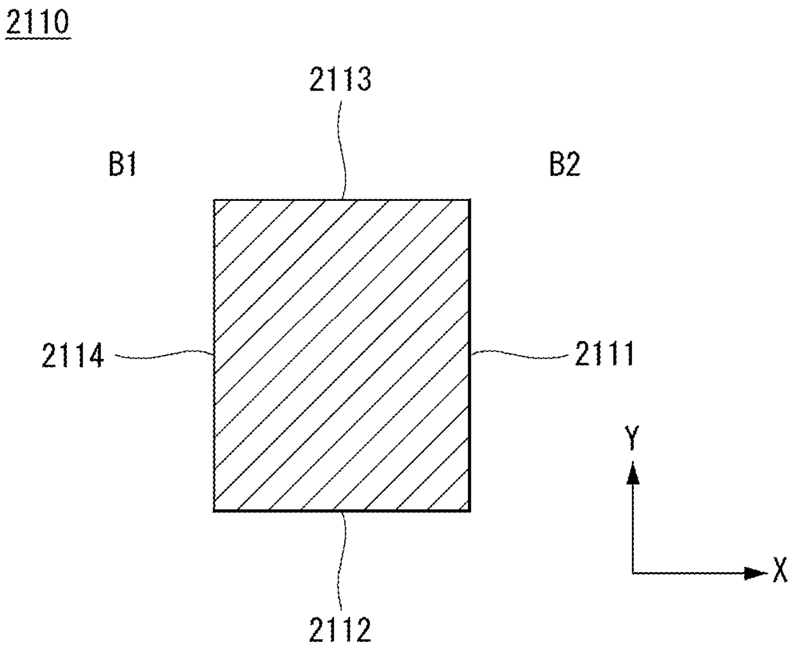
FIG. 10 illustrates a cross section of a fixing module of FIG. 9 taken along B1-B2.

FIG. 9 is a perspective view of the first fixing module 2100*a* of FIG. 1. FIG. 10 illustrates a cross section of a fixing module of FIG. 9 taken along B1-B2.

Referring to FIGS. 9 and 10, the first fixing module 2100*a* may be observed. A structure of the second fixing module 2100*b* (see FIG. 1) may be similar to a structure of the first fixing module 2100*a*. For example, the first fixing module 2100*a* and the second fixing module 2100*b* (see FIG. 1) may be different from each other in extension directions of a fixing body upper protrusion 2150 and a fixing body lower protrusion 2160.

The fixing module 2100 may include a fixing body 2110. The fixing body 2110 may form an overall shape of the fixing module 2100. The fixing body 2110 may extend downward from an upper end and lead to a lower end.

The fixing body 2110 may form the shape of a square pillar. For example, the fixing body 2110 may form an outer face. For example, the outer face of the fixing body 2110 may be divided into four.

For example, the fixing body 2110 may include a fixing body coupling face 2111. The fixing body coupling face 2111 may form a portion of the outer face of the fixing body 2110. The fixing body coupling face 2111 may face and be coupled to the cell coupling faces 1110 and 1120 (see FIG. 6). A shape of the fixing body coupling face 2111 may correspond to the shape of the cell coupling faces 1110 and 1120 (see FIG. 6).

For example, a fixing body coupling face 2111 of the first fixing module 2100*a* may face and be coupled to the first cell coupling face 1110 (see FIG. 6). For example, a fixing body coupling face 2111 of the second fixing module 2100*b* (see FIG. 1) may face and be coupled to the second cell coupling face 1120 (see FIG. 6).

The fixing body 2110 may include a fixing body front face 2112. The fixing body front face 2112 may form a front face of the fixing body 2110. The fixing body 2110 may include a fixing body rear face 2113.

The fixing body rear face 2113 may form a rear face of the fixing body 2110. The fixing body rear face 2113 may be coupled to the side cases 3100 and 3200 (see FIGS. 7 and 8).

For example, when the first fixing module 2100*a* is formed integrally with the first side case 3100 (see FIG. 7), a fixing body rear face 2113 of the first fixing module 2100*a* may not be formed.

For example, when the second fixing module 2100*b* (see FIG. 1) is formed integrally with the second side case 3200 (see FIG. 8), a fixing body rear face 2113 of the second fixing module 2100*b* (see FIG. 1) may not be formed.

The fixing body 2110 may include a fixing body side face 2114. The fixing body side face 2114 may be positioned opposite the fixing body coupling face 2111.

The fixing module 2100 may include the fixing body upper protrusion 2150. The fixing body upper protrusion 2150 may protrude upward from an upper end of the fixing body 2100. The fixing body upper protrusion 2150 may form a stepped portion with the upper end of the fixing body 2100.

Referring to FIGS. 7 and 9, the fixing body upper protrusion 2150 may form a shape extending in one direction. For example, the fixing body upper protrusion 2150 of the first fixing module 2100*a* may form a horizontally extending shape. For example, the fixing body upper protrusion 2150 of the first fixing module 2100*a* may form a shape extending in the front-rear direction.

For example, the fixing body upper protrusion 2150 of the second fixing module 2100*b* may form a horizontally extending shape. For example, the fixing body upper protrusion 2150 of the second fixing module 2100*b* may form a shape extending in a left-right direction. In other words, a direction in which the fixing body upper protrusion 2150 of the first fixing module 2100*a* extends may cross or intersect a direction in which the fixing body upper protrusion 2150 of the second fixing module 2100*b* extends.

The fixing module 2100 may include the fixing body lower protrusion 2160. The fixing body lower protrusion 2160 may protrude downward from a lower end of the fixing body 2100. The fixing body lower protrusion 2160 may form a stepped portion with the lower end of the fixing body 2100.

The fixing body protrusions 2150 and 2160 may indicate at least one of the fixing body upper protrusion 2150 and the fixing body lower protrusion 2160.

Referring to FIGS. 7 and 9, the fixing body lower protrusion 2160 may form a horizontally extending shape. A direction in which the fixing body lower protrusion 2160 horizontally extends may cross or intersect the direction in which the fixing body upper protrusion 2150 extends. For example, the fixing body lower protrusion 2160 of the first fixing module 2100*a* may form a shape extending in the left-right direction.

For example, the fixing body lower protrusion 2160 of the second fixing module 2100*b* may form a shape extending in the front-rear direction. In other words, a direction in which the fixing body lower protrusion 2160 of the first fixing module 2100*a* extends may cross or intersect a direction in which the fixing body lower protrusion 2160 of the second fixing module 2100*b* extends.

The fixing body upper protrusion 2150 may include an upper protrusion coupling hole 2155. The fixing body upper protrusion 2150 may be coupled to the upper bridge module 2501 (see FIG. 1) through the upper protrusion coupling hole 2155.

The fixing body lower protrusion 2160 may include a lower protrusion coupling hole (not shown). The fixing body lower protrusion 2160 may be coupled to the lower bridge module 2502 (see FIG. 1) through the lower protrusion coupling hole (not shown).

The protrusion coupling hole 2155 may indicate at least one of the upper protrusion coupling hole 2155 and the lower protrusion coupling hole (not shown).

Figure 11:
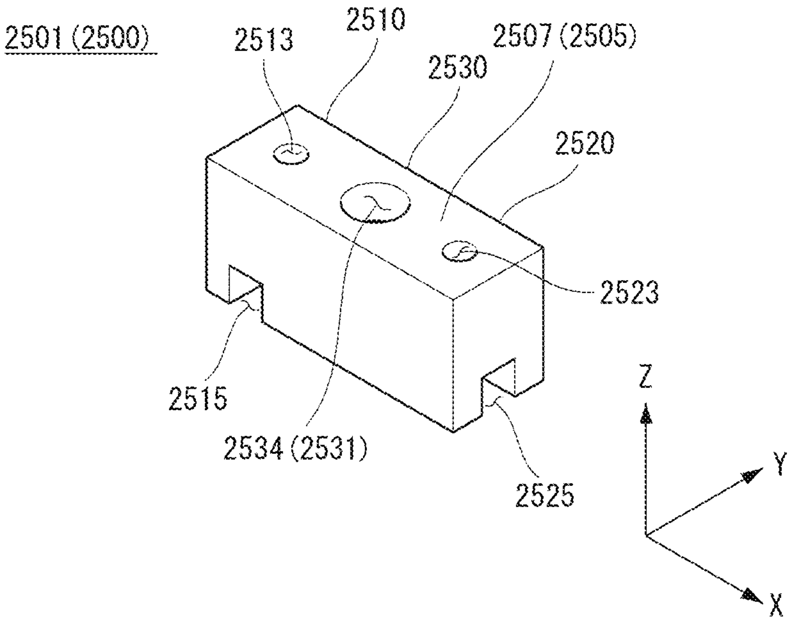
FIGS. 11 and 12 illustrate a bridge module according to an embodiment of the present disclosure when viewed from different directions.
Figure 12:
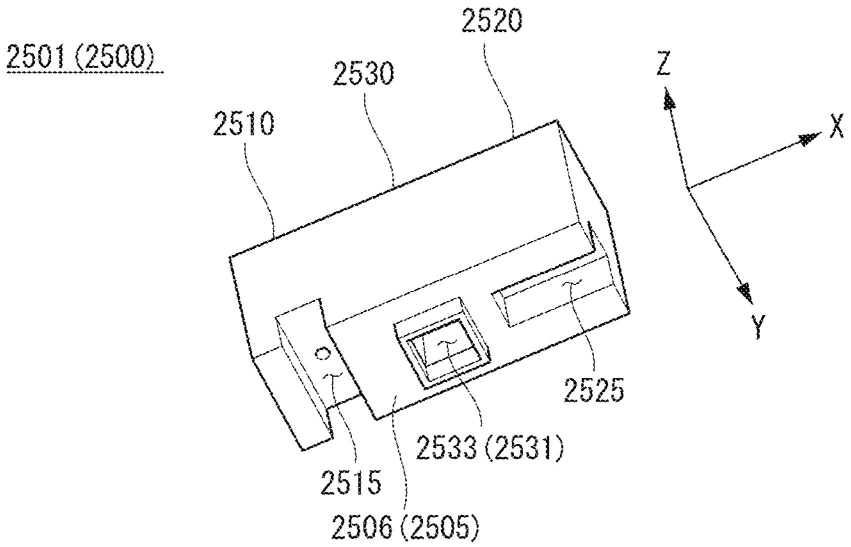

FIGS. 11 and 12 illustrate the bridge module 2500 according to an embodiment of the present disclosure when viewed from different directions.

Referring to FIGS. 11 and 12, the upper bridge module 2501 may be observed. A structure of the lower bridge module 2502 (see FIG. 1) may be similar to a structure of the upper bridge module 2501. For example, the upper bridge module 2501 and the lower bridge module 2502 (see FIG. 1) may be different from each other in extension directions of a first bridge groove 2515 and a second bridge groove 2525.

The bridge module 2500 may include a bridge body 2505. The bridge body 2505 may form an overall shape of the bridge module 2500. The bridge body 2505 may form a bridge body coupling face 2506. The bridge body coupling face 2506 may face the fixing module 2100 (see FIG. 1). The bridge body 2505 may include a bridge body opposing face 2507. The bridge body opposing face 2507 may be positioned opposite the bridge body coupling face 2506.

The bridge module 2500 may include a first bridge part 2510. The first bridge part 2510 may be a part of the bridge body 2505. The first bridge part 2510 may be coupled to the first fixing module 2100*a* (see FIG. 1).

The first bridge part 2510 may include a first bridge groove 2515. The first bridge groove 2515 may be coupled to the fixing body protrusions 2150 and 2160 (see FIG. 9) of the first fixing module 2100*a* (see FIG. 1). The first bridge groove 2515 may be recessed in the bridge body coupling face 2506.

The first bridge part 2510 may include a first bridge fastening hole 2513. The first bridge fastening hole 2513 may be recessed in the bridge body opposing face 2507. The first bridge fastening hole 2513 may communicate with the first bridge groove 2515. The first bridge fastening hole 2513 may communicate with the protrusion coupling hole 2155 (see FIG. 9) of the first fixing module 2100*a* (see FIG. 1).

A screw inserted into the first bridge fastening hole 2513 may be inserted and fixed in the protrusion coupling hole 2155 (see FIG. 9) of the fixing body protrusions 2150 and 2160 (see FIG. 9) positioned in the first bridge groove 2515. Through this process, the first fixing module 2100*a* (see FIG. 9) and the bridge module 2500 may be coupled to each other.

The bridge module 2500 may include a second bridge part 2520. The second bridge part 2520 may be another part of the bridge body 2505. The second bridge part 2520 may be coupled to the second fixing module 2100*b* (see FIG. 1).

The second bridge part 2520 may include a second bridge groove 2525. The second bridge groove 2525 may be coupled to the fixing body protrusions 2150 and 2160 (see FIG. 9) of the second fixing module 2100*b* (see FIG. 1). The second bridge groove 2525 may be recessed in the bridge body coupling face 2506.

The second bridge part 2520 may include a second bridge fastening hole 2523. The second bridge fastening hole 2523 may be recessed in the bridge body opposing face 2507.

The second bridge fastening hole 2523 may communicate with the second bridge groove 2525. The second bridge fastening hole 2523 may communicate with the protrusion coupling hole 2155 (see FIG. 9) of the second fixing module 2100*b* (see FIG. 1).

A screw inserted into the second bridge fastening hole 2523 may be inserted and fixed in the protrusion coupling hole 2155 (see FIG. 9) of the fixing body protrusions 2150 and 2160 (see FIG. 9) positioned in the second bridge groove 2525. Through this process, the second fixing module 2100*b* (see FIG. 9) and the bridge module 2500 may be coupled to each other. The bridge fastening holes 2513 and 2523 may indicate at least one of the first bridge fastening hole 2513 and the second bridge fastening hole 2523.

The bridge module 2500 may include a third bridge part 2530. The third bridge part 2530 may be another part of the bridge body 2505. The third bridge part 2530 may be positioned between the first bridge part 2510 and the second bridge part 2520.

The third bridge part 2530 may be coupled to the flow cell 1000 (see FIG. 1). The third bridge part 2530 may include a third bridge hollow portion 2531. The third bridge hollow portion 2531 may be formed in the third bridge part 2530. The third bridge hollow portion 2531 may extend from the bridge body coupling face 2506 and be connected to the bridge body opposing face 2507. The third bridge hollow portion 2531 may communication with the flow cell hollow portion 1050 (see FIG. 5).

The third bridge part 2530 may include a third bridge mounting opening 2533. The third bridge mounting opening 2533 may be formed in the bridge body coupling face 2506. The third bridge mounting opening 2533 may be coupled to the flow cell 1000 (see FIG. 1). The third bridge mounting opening 2533 may be connected to the third bridge hollow portion 2531. The third bridge mounting opening 2533 may be positioned between the first bridge groove 2515 and the second bridge groove 2525.

The third bridge part 2530 may include a third bridge external opening 2534. The third bridge external opening 2534 may be formed in the bridge body opposing face 2507. The third bridge external opening 2534 may be connected to the flow cell extension pipe 2535 (see FIG. 1). The third bridge external opening 2534 may be positioned between the first bridge fastening hole 2513 and the second bridge fastening hole 2523. The third bridge external opening 2534 may be connected to the third bridge hollow portion 2531.

Referring to FIGS. 9 to 12, a direction in which the fixing body upper protrusion 2150 extends may be different in the first fixing module 2100*a* and the second fixing module 2100*b*. Alternatively, a direction in which the fixing body lower protrusion 2160 extends may be different in the first fixing module 2100*a* and the second fixing module 2100*b*.

Hence, the following effects can be obtained. Since a bolt rotates when the bolt is inserted into and coupled to the bridge fastening holes 2513 and 2523 and the protrusion coupling hole 2155, the flow cell 1000 (see FIG. 1) may receive a twisting force. Due to the above arrangement of the fixing body protrusions 2150 and 2160, the twisting force received by the flow cell 1000 (see FIG. 1) can be minimized.

Figure 13:
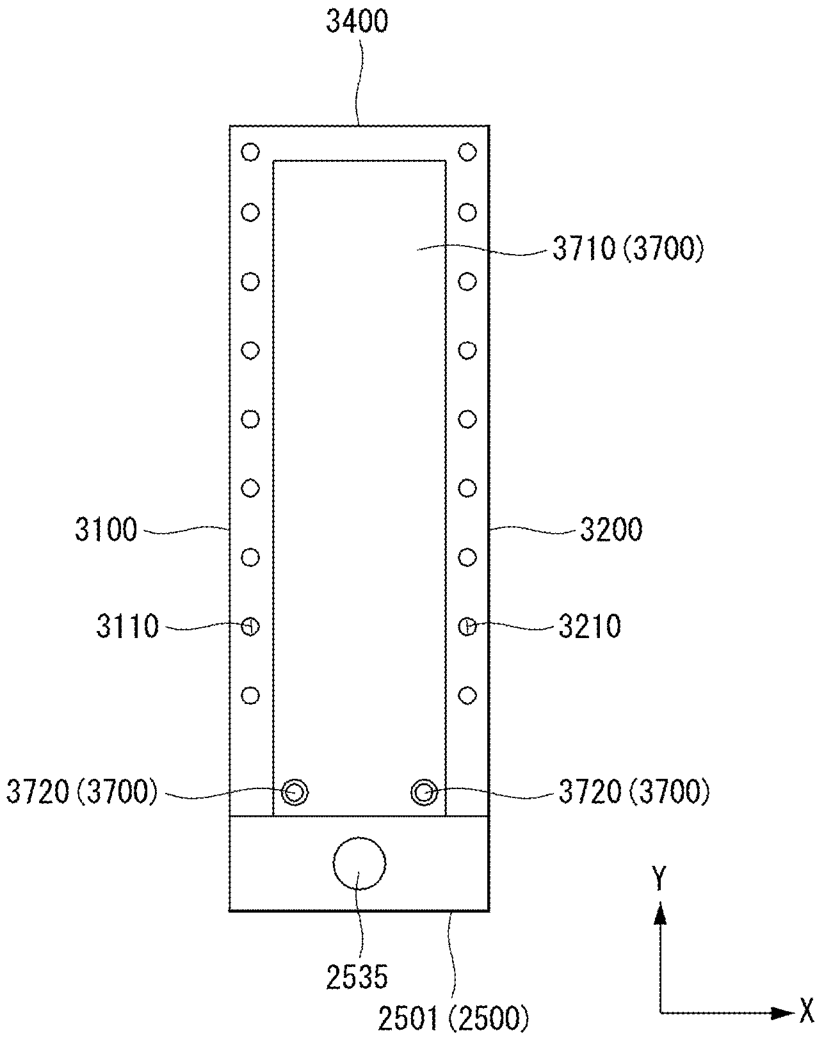
FIG. 13 illustrates a particle measuring device according to an embodiment of the present disclosure when viewed from above.

FIG. 13 illustrates a particle measuring device according to an embodiment of the present disclosure when viewed from above.

Referring to FIG. 13, the resonance plate 3710 may be disposed between an upper end of the first side case 3100 and an upper end of the second side case 3200. The resonance plate 3710 may be fastened to the upper front beam 3310 (see FIG. 7). For example, the front end of the resonance plate 3710 may be fastened to the upper front beam 3310 (see FIG. 7). For example, the front end of the resonance plate 3710 may be coupled to the upper front beam 3310 (see FIG. 7) by a resonance plate fixing part 3720. The front end of the resonance plate 3710 may be a fixed end. The resonance plate fixing part 3720 may be a bolt or a screw.

The resonance plate 3710 may be disposed between the first side case 3100 and the second side case 3200. The resonance plate 3710 may be separated from the first side case 3100 and the second side case 3200. The resonance plate 3710 may be separated from the rear case 3400. That is, the rear end of the resonance plate 3710 may be a free end.

The first side case 3100 may include a first side fastening hole 3110. The first side fastening hole 3110 may be formed at the upper end of the first side case 3100. A plurality of first side fastening holes 3110 may be provided. The plurality of first side fastening holes 3110 may be arranged to be spaced apart from each other in the front-rear direction.

The second side case 3200 may include a second side fastening hole 3210. The second side fastening hole 3210 may be formed in the upper end of the second side case 3200. A plurality of second side fastening holes 3210 may be provided. The plurality of second side fastening holes 3210 may be arranged to be spaced apart from each other in the front-rear direction. The side fastening holes 3110 and 3210 may indicate at least one of the first side fastening hole 3110 and the second side fastening hole 3210.

Figure 14:
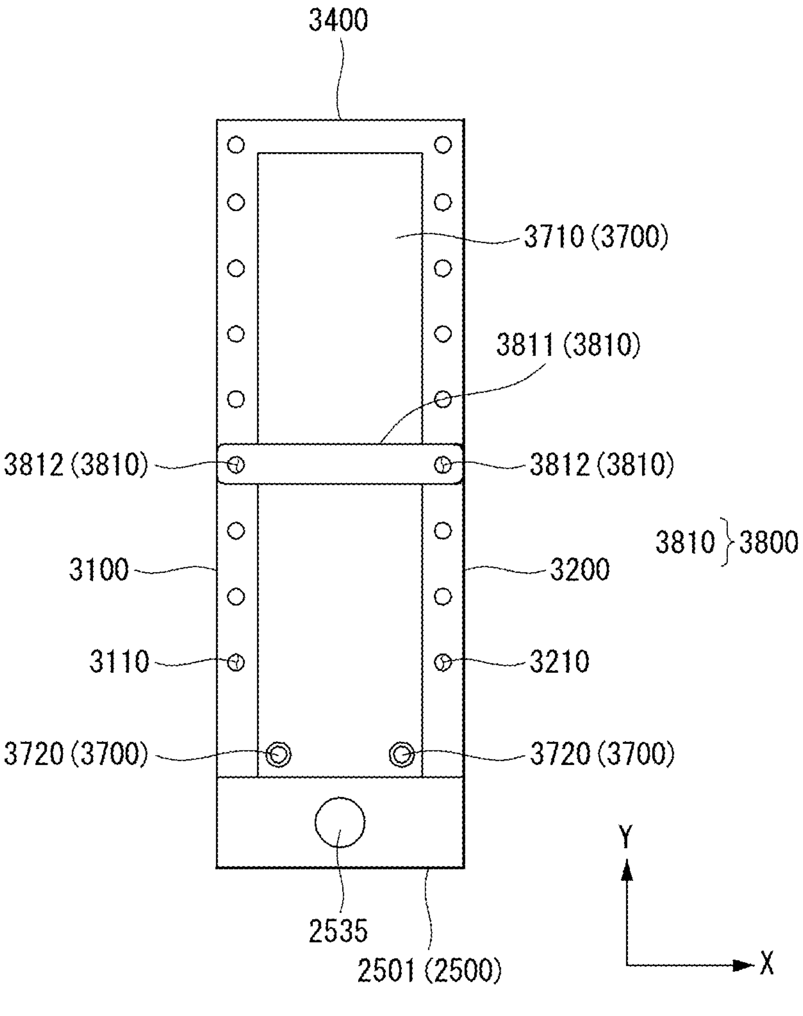
FIG. 14 illustrates that a sliding bar according to an embodiment of the present disclosure is installed in first and second side cases.

FIG. 14 illustrates that a sliding bar according to an embodiment of the present disclosure is installed in first and second side cases.

Referring to FIG. 14, a sliding module 3800 may include a sliding bar 3810. The sliding bar 3810 may be positioned on a face of the resonance plate 3710. For example, at least a portion of the sliding bar 3810 may be positioned on an upper face of the resonance plate 3710.

The sliding bar 3810 may include a sliding bar body 3811. The sliding bar body 3811 may form an overall shape of the sliding bar 3810. The sliding bar body 3811 may form a shape that extends from an end and leads to another end.

The sliding bar body 3811 may divide a face of the resonance plate 3710 in the front-rear direction. That is, the sliding bar body 3811 may cross the resonance plate 3710 in a transverse direction.

Sliding bar holes 3812 may be formed at both ends of the sliding bar body 3811. The sliding bar hole 3812 positioned at an end of the sliding bar body 3811 may correspond to the first side fastening hole 3110. The sliding bar hole 3812 positioned at another end of the sliding bar body 3811 may correspond to the second side fastening hole 3210.

When the bolts are sequentially inserted into and fastened to the sliding bar holes 3812 and the side fastening holes 3110 and 3210, the sliding bar body 3811 may connect the first side case 3100 to the second side case 3200.

When the bolts are sequentially inserted into and fastened to the sliding bar holes 3812 and the side fastening holes 3110 and 3210, the sliding bar body 3811 may be in contact with a face of the resonance plate 3710. The resonance plate 3710 may not vibrate at a position where the resonance plate 3710 is in contact with the sliding bar body 3811. That is, the resonance plate 3710 may form a fixed end at the position where the resonance plate 3710 is in contact with the sliding bar body 3811. Therefore, the natural frequency of the resonance plate 3710 can be adjusted by adjusting a position where the sliding bar body 3811 is disposed.

Figure 15:
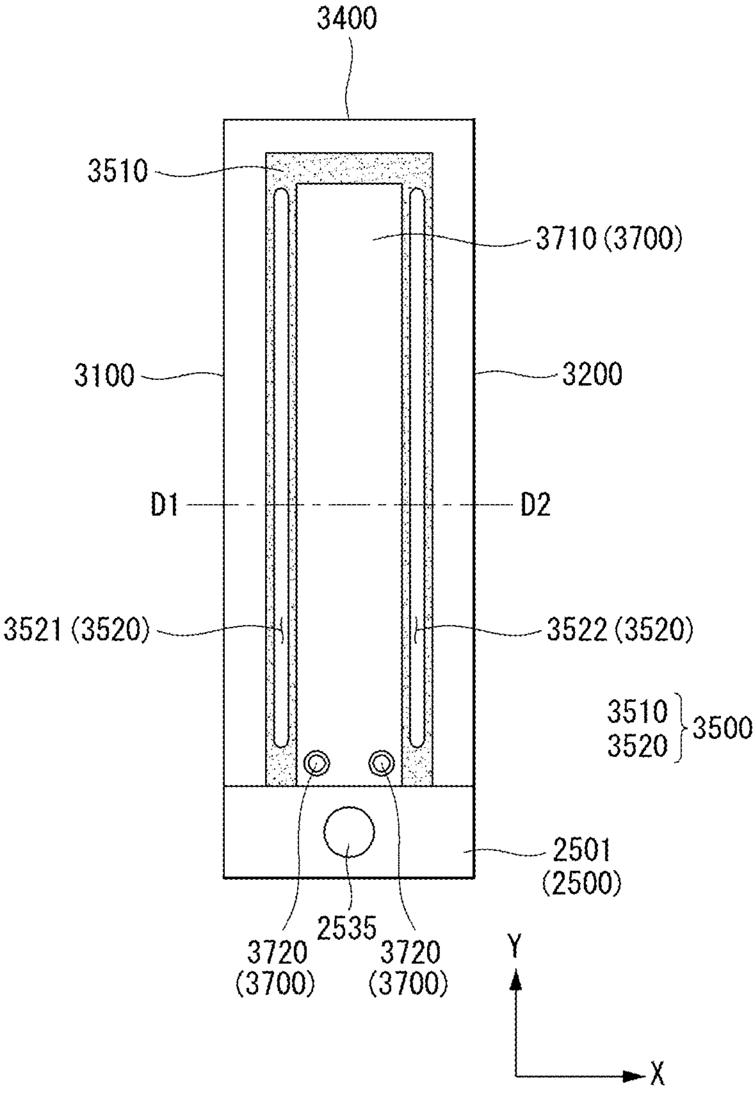
FIG. 15 illustrates a resonance unit with a sliding slit formed in an upper case.
Figure 16:
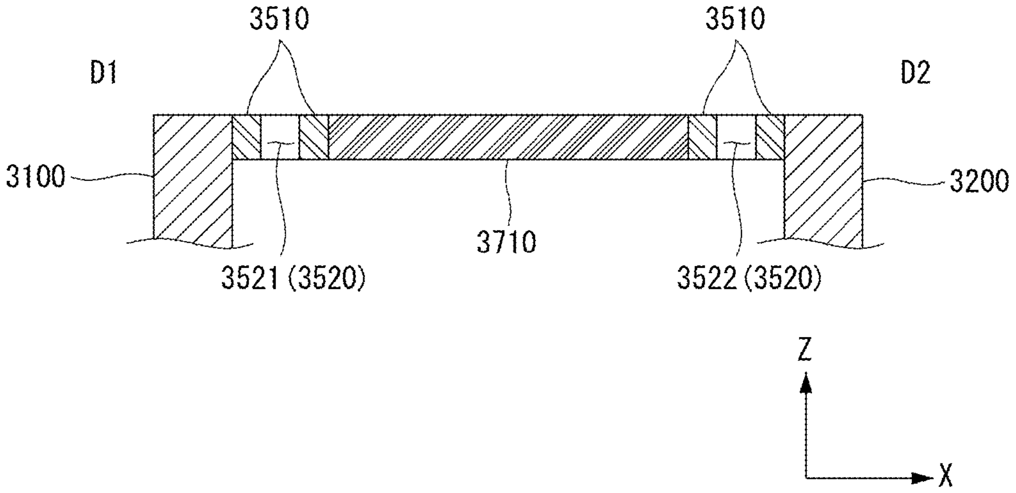
FIG. 16 illustrates a cross section of FIG. 15 taken along D1-D2.

FIG. 15 illustrates a resonance unit with a sliding slit formed in an upper case. FIG. 16 illustrates a cross section of FIG. 15 taken along D1-D2.

Referring to FIGS. 15 and 16, the resonance unit 3000 may include the upper case 3500. The upper case 3500 may include an upper case plate 3510. The upper case plate 3510 may form at least a portion of the upper face of the resonance unit 3000. The upper case plate 3510 may be connected to the side cases 3100 and 3200 and the rear case 3400.

The upper case 3500 may include an accommodation opening (not shown). The accommodation opening (not shown) may be formed in the upper case plate 3510. The accommodation opening (not shown) may accommodate the resonance plate 3710.

The upper case 3500 may include a sliding opening 3520. The sliding opening 3520 may include a first sliding opening 3521 and a second sliding opening 3522. The sliding opening 3520 may indicate at least one of the first sliding opening 3521 and the second sliding opening 3522.

The first sliding opening 3521 may be adjacent to the first side case 3100. The second sliding opening 3522 may be adjacent to the second side case 3200.

The first sliding opening 3521 may be disposed between the first side case 3100 and the second sliding opening 3522. The first sliding opening 3521 may be formed between the first side case 3100 and the resonance plate 3710.

The second sliding opening 3522 may be disposed between the first sliding opening 3521 and the second side case 3200. The second sliding opening 3522 may be formed between the second side case 3200 and the resonance plate 3710.

The sliding opening 3520 may form an elongated shape in one direction. Alternatively, the sliding opening 3520 may have an extended shape in one direction. For example, the sliding opening 3520 may form a shape extending in the front-rear direction.

Figure 17:
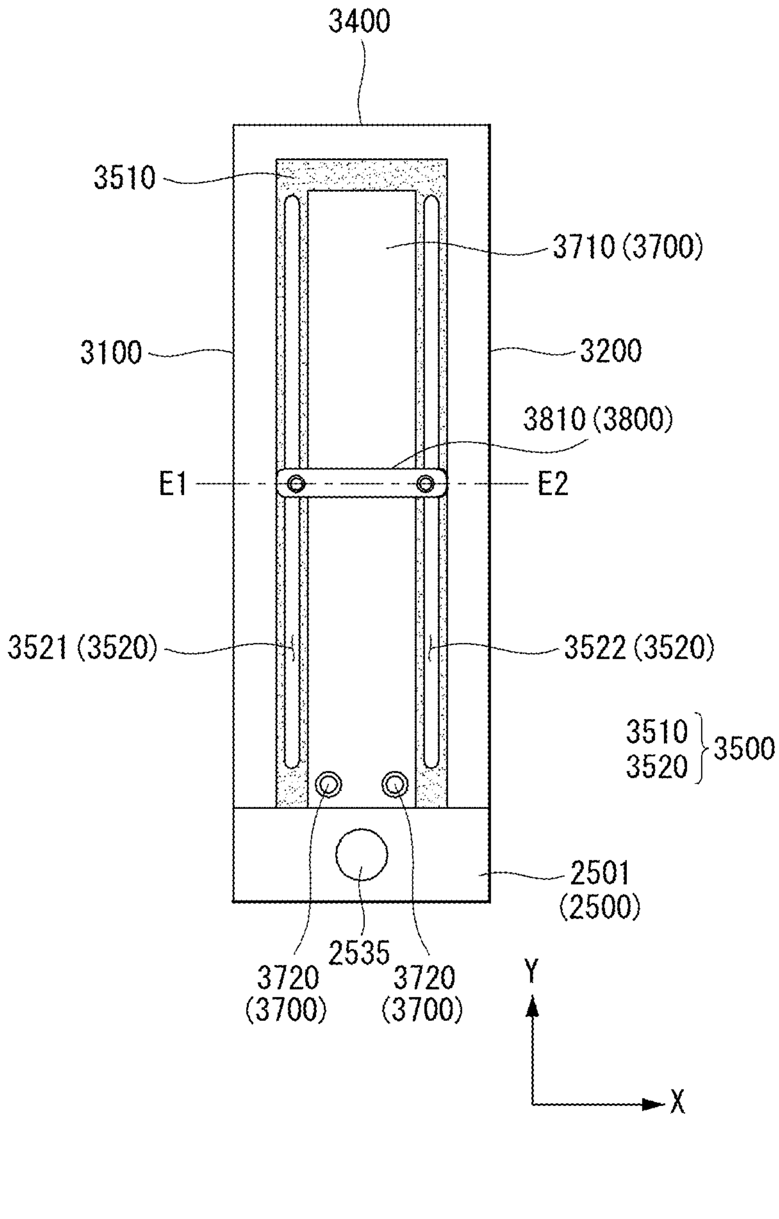
FIG. 17 illustrates that a sliding bar is connected to a sliding opening illustrated in FIG. 15.
Figure 18:
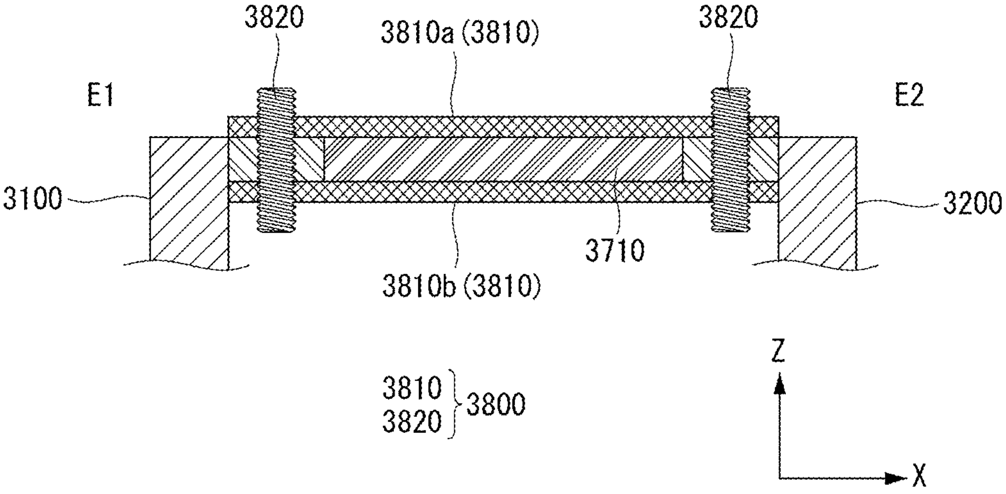
FIG. 18 illustrates a cross section of FIG. 17 taken along E1-E2.

FIG. 17 illustrates that a sliding bar is connected to a sliding opening illustrated in FIG. 15. FIG. 18 illustrates a cross section of FIG. 17 taken along E1-E2.

Referring to FIGS. 17 and 18, a plurality of sliding bars 3810 may be provided. For example, the sliding bars 3810 may include a first sliding bar 3810*a* and a second sliding bar 3810*b*. The sliding bar 3810 may indicate at least one of the first sliding bar 3810*a* and the second sliding bar 3810*b*.

The first sliding bar 3810*a* may be positioned on a face of the resonance plate 3710. The second sliding bar 3810*b* may be positioned on another face of the resonance plate 3710. The resonance plate 3710 may be positioned between the first sliding bar 3810*a* and the second sliding bar 3810*b*.

Holes may be formed at both ends of the sliding bar 3810. The holes formed at both ends of the sliding bar 3810 may communicate with the sliding opening 3520. The hole formed at one end of the sliding bar 3810 may be referred to as a "first fixing hole." The hole formed at the other end of the sliding bar 3810 may be referred to as a "second fixing hole."

A thread may be formed on an outer face of each of the holes formed at both ends of the sliding bar 3810. The thread formed on the outer face of each of the holes formed at both ends of the sliding bar 3810 may be referred to as a "sliding bar thread."

The sliding module 3800 may include a fixing part 3820. The fixing part 3820 may be accommodated in the sliding opening 3520. The fixing part 3820 may move along the sliding opening 3520 in the sliding opening 3520.

The fixing part 3820 coupled to the first fixing hole of the sliding bar 3810 may be referred to as a "first fixing part." The fixing part 3820 coupled to the second fixing hole of the sliding bar 3810 may be referred to as a "second fixing part." The first fixing part may be accommodated in and coupled to the first sliding opening 3521. The second fixing part may be accommodated in and coupled to the second sliding opening 3522.

The fixing part 3820 may include bolts or screws. A thread may be formed on an outer face of the fixing part 3820. The thread formed on the outer face of the fixing part 3820 may be referred to as a "fixing part thread." The sliding bar thread may be coupled to the fixing part thread.

Referring to FIGS. 17 and 18, the sliding opening 3520 except for a portion covered by the sliding bar 3810 may be exposed to the outside. The sliding module 3800 may include a shielding member (not shown) that shields the sliding opening 3520 exposed to the outside.

Figure 19:
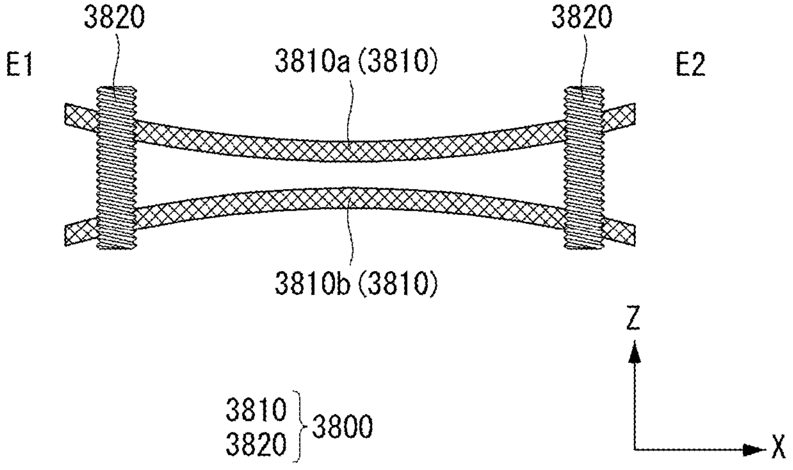
FIG. 19 illustrates a sliding bar illustrated in FIG. 18 before being in contact with a resonance plate.

FIG. 19 illustrates a sliding bar illustrated in FIG. 18 before being in contact with a resonance plate. In FIG. 19, only the sliding module may be displayed for convenience of explanation.

Referring to FIGS. 18 and 19, before the sliding bar 3810 is in close contact with the resonance plate 3710, the sliding bar 3810 may form a curved shape toward the resonance plate 3710. For example, the first sliding bar 3810*a* and the second sliding bar 3810*b* may form a curved shape toward the resonance plate 3710.

The sliding bar 3810 may have elasticity. When the fixing part 3820 rotates, the sliding bar thread and the fixing part thread may engage with each other, thereby allowing the end of the sliding bar 3810 to move. For example, when the fixing part 3820 rotates, the end of the sliding bar 3810 may move toward the upper case plate 3510 (see FIG. 17).

When the end of the first sliding bar 3810*a* and the end of the second sliding bar 3810*b* move toward the upper case plate 3510 (see FIG. 17), the sliding bar 3810 may become flatter. Since the sliding bar 3810 has the elasticity, the sliding bar 3810 may provide an elastic force to the resonance plate 3710.

That is, the resonance plate 3710 may be in contact with and coupled to the sliding bar 3810 by the elastic force of the sliding bar 3810. Accordingly, the resonance plate 3710 may form a fixed end at a position where the resonance plate 3710 is in contact with the sliding bar 3810. As the fixing part 3820 moves along the sliding opening 3520 in the sliding opening 3520, the natural frequency of the resonance plate 3710 can be adjusted.

Referring to FIGS. 17 to 19, the sliding bar 3810 may be provided singly. For example, the sliding bar 3810 may be disposed on the upper face of the resonance plate 3710. For another example, the sliding bar 3810 may be disposed on a lower face of the resonance plate 3710.

Before the sliding bar 3810 is in close contact with the resonance plate 3710, the sliding bar 3810 may form a curved shape toward the resonance plate 3710. For example, the sliding bar 3810 may form a convex shape toward the resonance plate 3710.

For another example, the resonance plate 3710 may be spaced apart from the cases 3100, 3200, 3300, 3400 and 3500. For example, the resonance plate 3710 may be positioned in the resonance space. In this case, a "connection member" that connects an end of the resonance plate 3710 to the cases 3100, 3200, 3300, 3400 and 3500 may be formed. The end of the resonance plate 3710 may be fixed to the connection member to form a fixed end.

Figure 20:
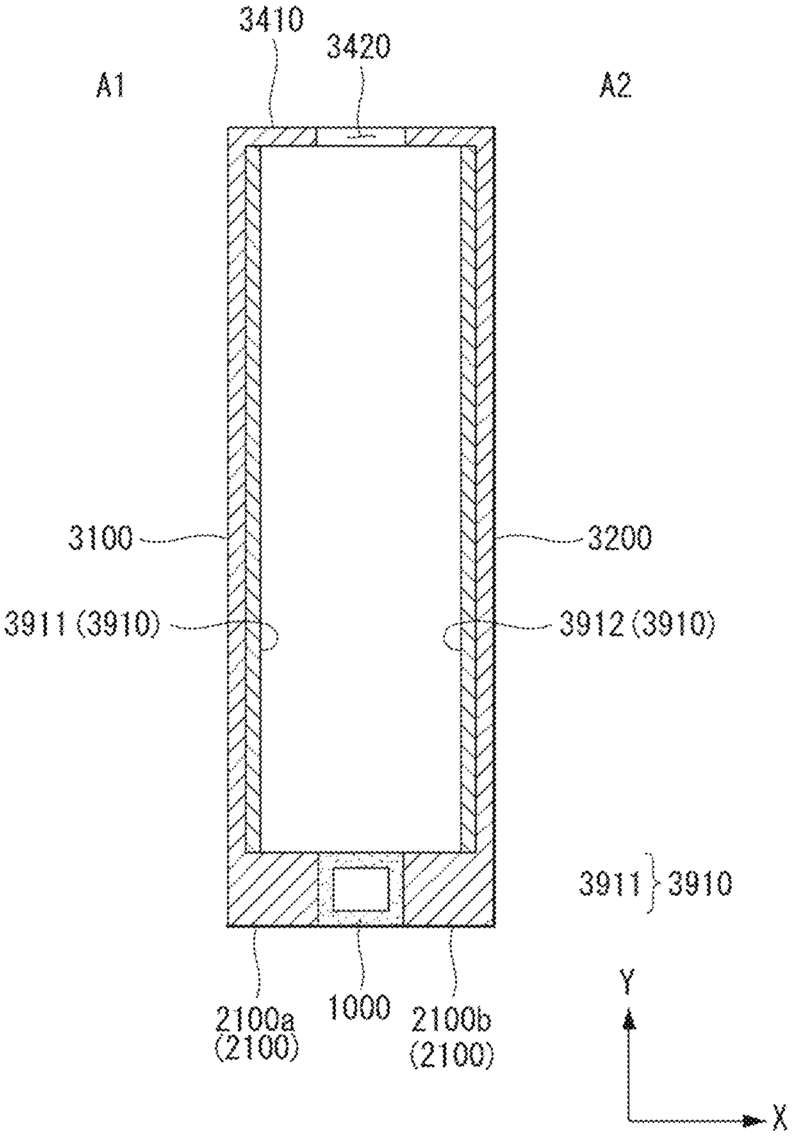
FIG. 20 illustrates a cross section of a resonance unit and a mount unit illustrated in FIG. 7 taken along A1-A2.

FIG. 20 illustrates a cross section of a resonance unit and a mount unit illustrated in FIG. 7 taken along A1-A2. In FIG. 20, a cross section of the flow cell 1000 may be illustrated together for convenience of explanation.

Referring to FIG. 20, the resonance unit 3000 may form a resonance space inside. The resonance unit 3000 may include a lower case (not shown). The resonance space may be formed by the side cases 3100 and 3200, the lower case (not shown), the bridge module 2500 (see FIG. 1), the rear case 3400, and an upper part. Here, the upper part may include at least one of the resonance plate 3710 (see FIG. 1) and the upper case 3500 (see FIG. 17).

The resonance unit 3000 may include a resonance space adjustment module 3900.

The resonance space adjustment module 3900 may include a resonance space adjustment plate 3910. The resonance space adjustment plate 3910 may be positioned between the first side case 3100 and the second side case 3200.

The resonance space adjustment plate 3910 may be disposed adjacent to the side cases 3100 and 3200. The resonance space adjustment plate 3910 may be positioned on or coupled to the inner faces of the case 3100, 3200, 3300, 3400 and 3500. For example, the resonance space adjustment plate 3910 may be movably coupled to the inner faces of the cases 3100, 3200, 3300, 3400 and 3500.

A plurality of resonance space adjustment plates 3910 may be provided. The resonance space adjustment plates 3910 may include a first resonance space adjustment plate 3911 and a second resonance space adjustment plate 3912. The resonance space adjustment plate 3910 may indicate at least one of the first resonance space adjustment plate 3911 and the second resonance space adjustment plate 3912.

The first resonance space adjustment plate 3911 and the second resonance space adjustment plate 3912 may be spaced apart from each other. For example, the first resonance space adjustment plate 3911 and the second resonance space adjustment plate 3912 may face each other. The first resonance space adjustment plate 3911 and the second resonance space adjustment plate 3912 may move away from or approach each other.

The first resonance space adjustment plate 3911 may be adjacent to the first side case 3100. The first resonance space adjustment plate 3911 may be positioned between the first side case 3100 and the second resonance space adjustment plate 3912.

The second resonance space adjustment plate 3912 may be adjacent to the second side case 3200. The second resonance space adjustment plate 3912 may be positioned between the second side case 3200 and the first resonance space adjustment plate 3911.

The resonance space adjustment plate 3910 may face the resonance space. In other words, the shape and/or the size of the resonance space may change by the resonance space adjustment plate 3910.

Referring to FIGS. 1 to 20, although not illustrated, the resonance plate 3710 may be coupled to the side cases 3100 and 3200. For example, the side cases 3100 and 3200 may include an accommodation opening as an opening. The resonance plate 3710 may be positioned in the accommodation openings of the side cases 3100 and 3200. An end of the resonance plate 3710 may be coupled and fixed to the side cases 3100 and 3200.

Figure 21:
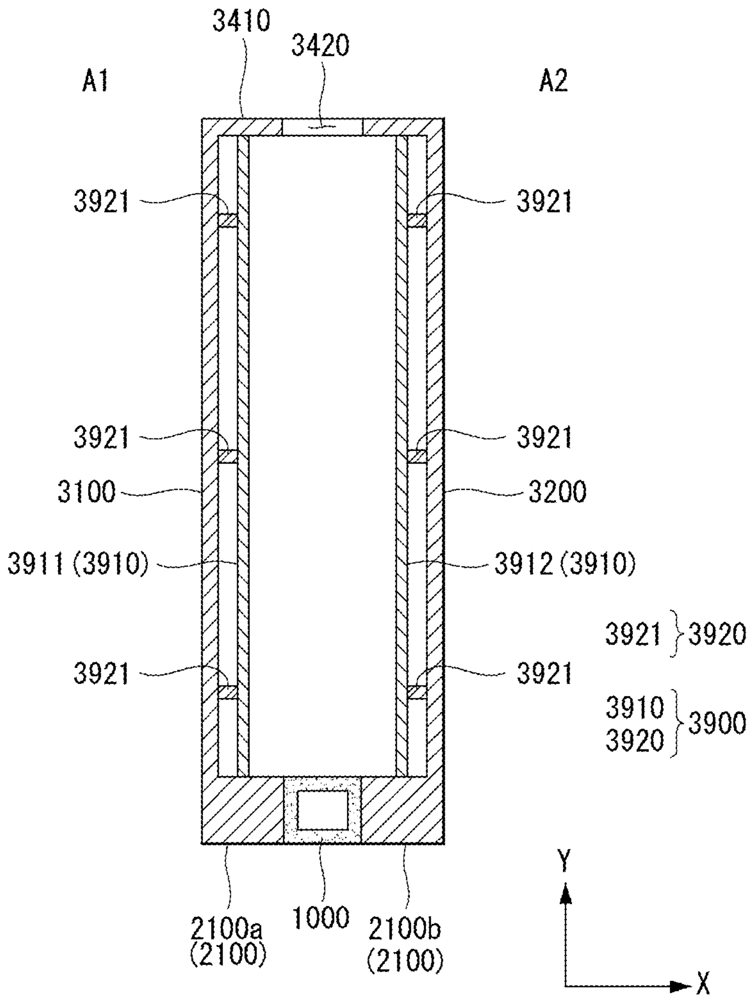
FIG. 21 illustrates, as a cross section of a resonance unit and a mount unit illustrated in FIG. 7 taken along A1-A2, that a resonance space adjustment plate moves by a plate mover.

FIG. 21 illustrates, as a cross section of a resonance unit and a mount unit illustrated in FIG. 7 taken along A1-A2, that the resonance space adjustment plate 3910 moves by a plate mover 3920. In FIG. 21, a cross section of the flow cell 1000 may be illustrated together for convenience of explanation.

Referring to FIGS. 20 and 21, the resonance space adjustment module 3900 may include a plate mover 3920. The plate mover 3920 may be coupled or fixed to the cases 3100, 3200, 3300, 3400 and 3500. The plate mover 3920 may be connected or coupled to the resonance space adjustment plate 3910 and may move the resonance space adjustment plate 3910.

The plate mover 3920 may include a connection shaft 3921. The connection shaft 3921 may be connected to the resonance space adjustment plate 3910 and the side cases 3100 and 3200, The resonance space adjustment plate 3910 may move along the connection shaft 3921.

When the resonance space adjustment plate 3910 moves, the shape and/or the size of the resonance space may change. For example, the first resonance space adjustment plate 3911 and the second resonance space adjustment plate 3912 may move closer to or away from each other. For example, the resonance space illustrated in FIG. 21 may be smaller in size and narrower in width, compared to the resonance space illustrated in FIG. 20.

If the shape or/and the size of the resonance space changes, the resonance frequency of the resonance space may vary. Therefore, the resonance frequency of the resonance space can be adjusted by adjusting the position of the resonance space adjustment plate 3910.

Figure 22:
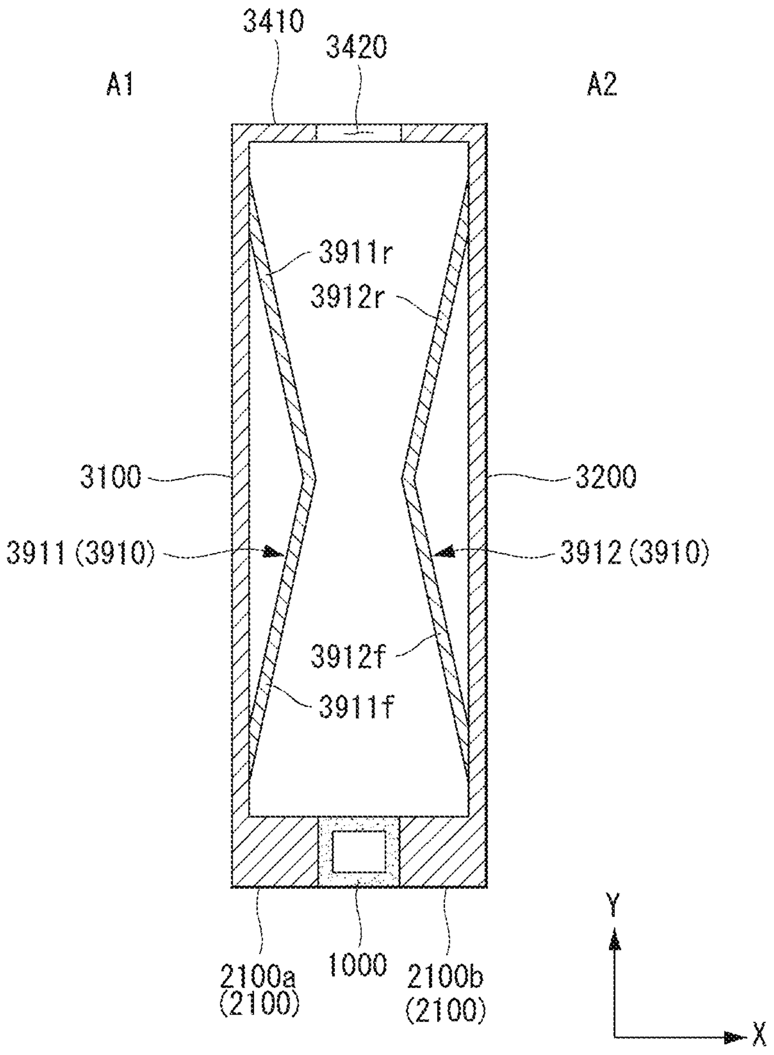
FIG. 22 illustrates, as a cross section of a resonance unit and a mount unit illustrated in FIG. 7 taken along A1-A2, that a resonance space adjustment plate is bent in accordance with an embodiment of the present disclosure.

FIG. 22 illustrates, as a cross section of a resonance unit and a mount unit illustrated in FIG. 7 taken along A1-A2, that the resonance space adjustment plate 3910 is bent in accordance with an embodiment of the present disclosure. In FIG. 22, a cross section of the flow cell 1000 may be illustrated together for convenience of explanation.

Referring to FIGS. 20 and 22, the first resonance space adjustment plate 3911 may be bent toward the second resonance space adjustment plate 3912. For example, the second resonance space adjustment plate 3912 may be bent toward the first resonance space adjustment plate 3911.

The first resonance space adjustment plate 3911 may be divided into two segments. For example, the first resonance space adjustment plate 3911 may include a first front resonance space adjustment plate 3911*f* and a first rear resonance space adjustment plate 3911*r*. The first front resonance space adjustment plate 3911*f* and the first rear resonance space adjustment plate 3911*r* may be connected to each other.

The second resonance space adjustment plate 3912 may be divided into two segments. For example, the second resonance space adjustment plate 3912 may include a second front resonance space adjustment plate 3912*f* and a second rear resonance space adjustment plate 3912*r*. The second front resonance space adjustment plate 3912*f* and the second rear resonance space adjustment plate 3912*r* may be connected to each other.

For example, the first front resonance space adjustment plate 3911*f* and the second front resonance space adjustment plate 3912*f* may face each other, as illustrated in FIG. 20.

When the first resonance space adjustment plate 3911 is bent toward the second resonance space adjustment plate 3912 or the second resonance space adjustment plate 3912 is bent toward the first resonance space adjustment plate 3911, the first front resonance space adjustment plate 3911*f* and the second front resonance space adjustment plate 3912*f* may face each other at an angle.

For example, the first rear resonance space adjustment plate 3911*r* and the second rear resonance space adjustment plate 3912*r* may face each other, as illustrated in FIG. 20.

The front resonance space adjustment plates 3911*f* and 3912*f* may include or indicate at least one of the first front resonance space adjustment plate 3911*f* and the second front resonance space adjustment plate 3912*f*.

The rear resonance space adjustment plates 3911*r* and 3912*r* may include or indicate at least one of the first rear resonance space adjustment plate 3911*r* and the second rear resonance space adjustment plate 3912*r*.

The resonance space adjustment plate 3910 may be bent at a boundary between the front resonance space adjustment plates 3911*f* and 3912*f* and the rear resonance space adjustment plates 3911*r* and 3912*r*. For example, the resonance space adjustment plate 3910 may be convex toward the resonance space.

When the first resonance space adjustment plate 3911 is bent toward the second resonance space adjustment plate 3912 or the second resonance space adjustment plate 3912 is bent toward the first resonance space adjustment plate 3911, the first rear resonance space adjustment plate 3911*r* and the second rear resonance space adjustment plate 3912*r* may face each other at an angle.

When the first resonance space adjustment plate 3911 is bent toward the second resonance space adjustment plate 3912 or the second resonance space adjustment plate 3912 is bent toward the first resonance space adjustment plate 3911, a width between the first resonance space adjustment plate 3911 and the second resonance space adjustment plate 3912 may decrease and increase while the width goes from the flow cell 1000 to the rear case opening 3420. Therefore, an amplification effect of acoustic waves can increase.

When the first resonance space adjustment plate 3911 is bent toward the second resonance space adjustment plate 3912 or the second resonance space adjustment plate 3912 is bent toward the first resonance space adjustment plate 3911, the resonance space may be divided into two. For example, the resonance space may be divided into a first resonance space and a second resonance space.

The first resonance space may be a portion of the resonance space positioned between the first front resonance space adjustment plate 3911*f* and the second front resonance space adjustment plate 3912*f*.

The second resonance space may be a portion of the resonance space positioned between the first rear resonance space adjustment plate 3911*r* and the second rear resonance space adjustment plate 3912*r*.

Figure 23:
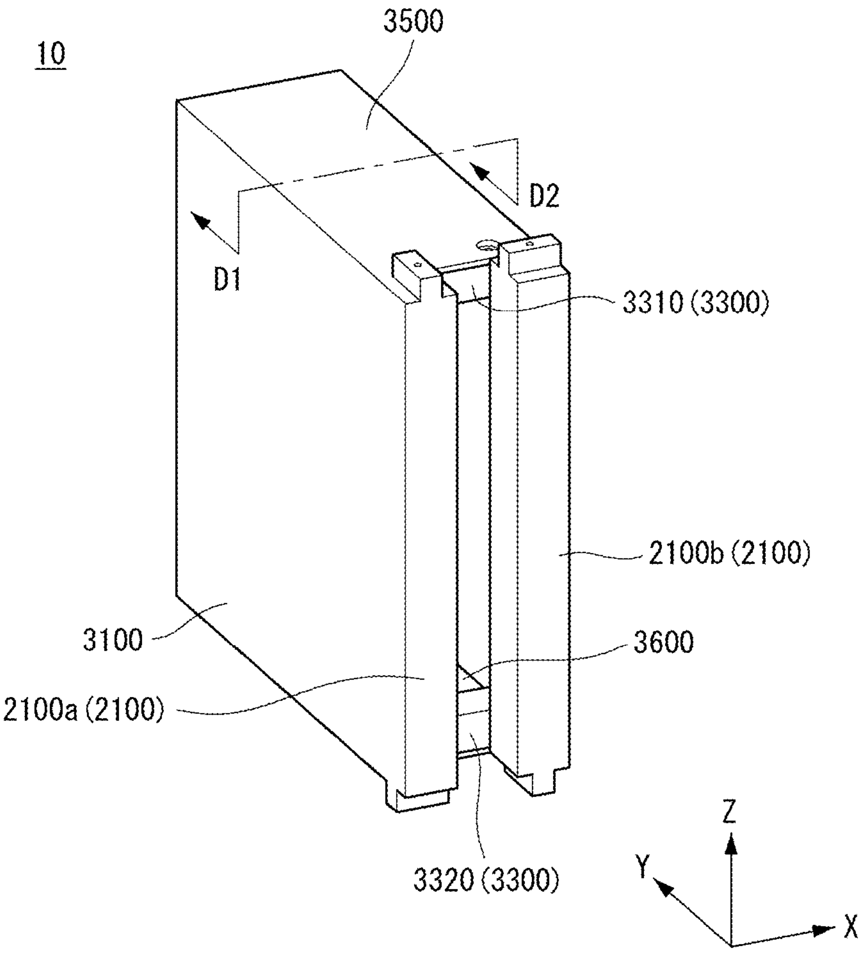
FIG. 23 illustrates a case according to an embodiment of the present disclosure.

FIG. 23 illustrates a case according to an embodiment of the present disclosure.

Referring to FIG. 23, the cases 3100, 3200, 3300, 3400, 3500 and 3600 may include the upper case 3500 and a lower case 3600. The upper case 3500 may connect the upper end of the first side case 3100 to the upper end of the second side case 3200. The upper case 3500 may form the upper face of the resonance unit 3000.

The lower case 3600 may connect a lower end of the first side case 3100 to a lower end of the second side case 3200. The lower case 3600 below the upper case 3500 may face the upper case 3500. The lower case 3600 may form the lower face of the resonance unit 3000.

Figure 24:
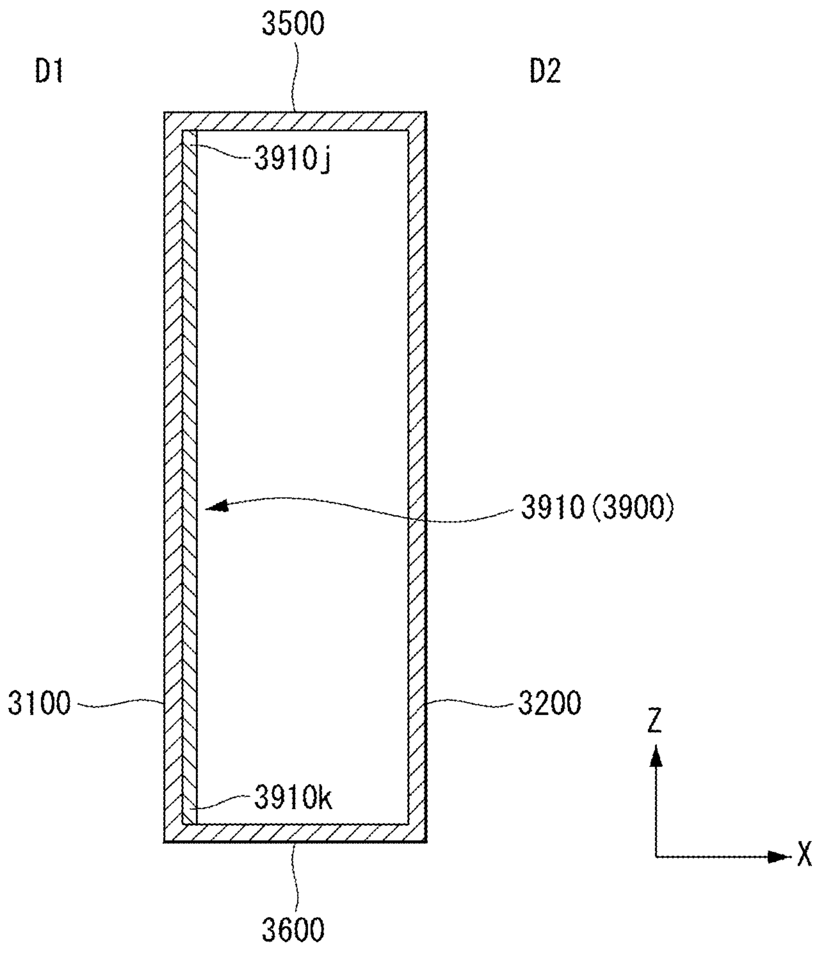
FIG. 24 illustrates a cross section of a case illustrated in FIG. 23 taken along D1-D2.
Figure 25:
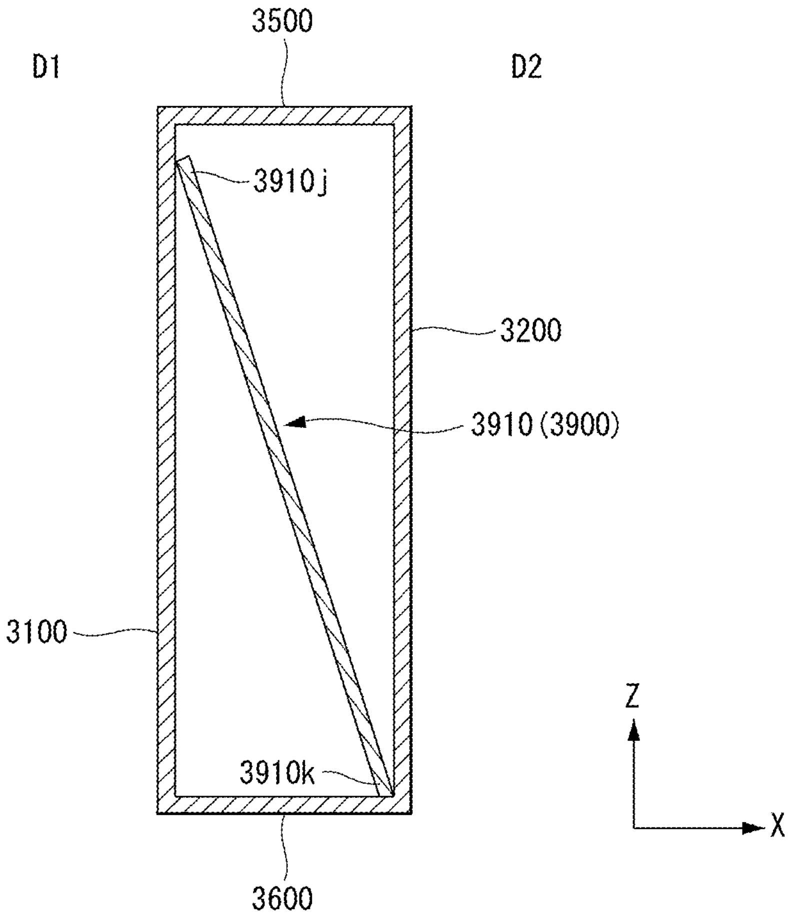
FIG. 25 illustrates that a resonance space adjustment plate illustrated in FIG. 24 moves.

FIG. 24 illustrates a cross section of a case illustrated in FIG. 23 taken along D1-D2. FIG. 25 illustrates that a resonance space adjustment plate illustrated in FIG. 24 moves.

Referring to FIG. 24, the resonance space adjustment plate 3910 may be positioned on the inner faces of the cases 3100, 3200, 3300, 3400, 3500 and 3600. For example, the resonance space adjustment plate 3910 may be in contact with the inner face of the first side case 3100.

The resonance space adjustment plate 3910 may form both ends. For example, the resonance space adjustment plate 3910 may include a first end 3910*j* and a second end 3910*k*. The resonance space adjustment plate 3910 may form a shape that extends from the first end 3910*j* and lead to the second end 3910*k*.

Referring to FIG. 25, the resonance space adjustment plate 3910 may move on the inner faces of the cases 3100, 3200, 3300, 3400, 3500 and 3600.

For example, the first end 3910*j* of the resonance space adjustment plate 3910 may be movably in contact with the inner face of the first side case 3100. The first side case 3100 which is in contact with the first end 3910*j* of the resonance space adjustment plate 3910 may be referred to as a "first case."

For example, the second end 3910*k* of the resonance space adjustment plate 3910 may be movably in contact with the inner face of the lower case 3600. The lower case 3600 which is in contact with the second end 3910*k* of the resonance space adjustment plate 3910 may be referred to as a "second case." The first case and the second case may be connected to each other to form an angle.

In other words, the resonance space adjustment plate 3910 may change its attitude with respect to the cases 3100, 3200, 3300, 3400, 3500 and 3600 while being in contact with the inner faces of the cases 3100, 3200, 3300, 3400, 3500 and 3600. When the resonance space adjustment plate 3910 changes its attitude with respect to the cases 3100, 3200, 3300, 3400, 3500 and 3600 while being in contact with the inner faces of the cases 3100, 3200, 3300, 3400, 3500 and 3600, at least one of the shape and the size of the resonance space can be changed. Hence, a resonance frequency of the resonance unit 3000 can be changed.

For another example, the resonance space adjustment plate 3910 may be flexible. For example, the first end 3910*j* of the resonance space adjustment plate 3910 may be fixed to the first side case 3100, and the second end 3910*k* of the resonance space adjustment plate 3910 may be movably in contact with the inner face of the lower case 3600. Hence, at least one of the shape and the size of the resonance space can be changed, and the resonance frequency of the resonance unit 3000 can be changed.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. A particle measuring device comprising:

a mount unit fixing a flow cell; and a resonance unit disposed behind the mount unit, the resonance unit forming a hollow portion that is open forward and rearward, wherein the mount unit includes:

a fixing module including a first fixing module and a second fixing module, wherein the first fixing module and the second fixing module are positioned in front of the resonance unit and are horizontally disposed with the flow cell interposed therebetween; and a bridge module including an upper bridge module and a lower bridge module that are respectively coupled to an upper end and a lower end of the fixing module, wherein each of the first fixing module and the second fixing module includes:

a fixing body extending in an up-down direction;

a fixing body upper protrusion formed on an upper end of the fixing body and coupled to the upper bridge module; and a fixing body lower protrusion formed on a lower end of the fixing body and coupled to the lower bridge module.

2. The particle measuring device of claim 1, wherein the fixing body upper protrusion forms a stepped portion with the upper end of the fixing body.

3. The particle measuring device of claim 2, wherein the fixing body lower protrusion forms a stepped portion with the lower end of the fixing body.

4. The particle measuring device of claim 1, wherein a direction in which the fixing body upper protrusion of the first fixing module extends horizontally intersects a direction in which the fixing body upper protrusion of the second fixing module extends horizontally.

5. The particle measuring device of claim 1, wherein a direction in which the fixing body upper protrusion of the first fixing module extends horizontally intersects a direction in which the fixing body lower protrusion of the first fixing module extends horizontally.

6. The particle measuring device of claim 1, wherein each of the upper bridge module and the lower bridge module includes:

a bridge body forming a bridge body coupling face facing the fixing module;

a first bridge part formed on the bridge body and coupled to the first fixing module; and a second bridge part formed on the bridge body and coupled to the second fixing module.

7. The particle measuring device of claim 6, wherein each of the upper bridge module and the lower bridge module includes a third bridge part that is formed on the bridge body and is coupled to the flow cell.

8. The particle measuring device of claim 7, wherein the third bridge part is positioned between the first bridge part and the second bridge part.

9. The particle measuring device of claim 7, wherein the third bridge part includes a third bridge mounting opening that is formed in the bridge body coupling face and is coupled to the flow cell.

10. The particle measuring device of claim 9, wherein the bridge body includes a bridge body opposing face formed opposite the bridge body coupling face, and wherein the third bridge part includes:

a third bridge external opening formed in the bridge body opposing face; and a third bridge hollow portion extending from the third bridge mounting opening and connected to the third bridge external opening.

11. The particle measuring device of claim 10, further comprising a flow cell extension pipe connected to the third bridge external opening.

12. The particle measuring device of claim 11, wherein the flow cell communicates with the flow cell extension pipe through the third bridge hollow portion.

13. The particle measuring device of claim 6, wherein the first bridge part includes a first bridge groove that is recessed in the bridge body coupling face and is coupled to one of the fixing body upper protrusion and the fixing body lower protrusion of the first fixing module, and wherein the second bridge part includes a second bridge groove that is recessed in the bridge body coupling face and is coupled to one of the fixing body upper protrusion and the fixing body lower protrusion of the second fixing module.

14. The particle measuring device of claim 13, wherein a direction in which the first bridge groove extends horizontally intersects a direction in which the second bridge groove extends horizontally.

15. The particle measuring device of claim 13, wherein the bridge body includes a bridge body opposing face formed opposite the bridge body coupling face, wherein the first bridge part includes a first bridge fastening hole that is recessed in the bridge body opposing face and communicates with the first bridge groove, and wherein the second bridge part includes a second bridge fastening hole that is recessed in the bridge body opposing face and communicates with the second bridge groove.

* * * * *